US011977456B2

(12) United States Patent
Dodge

(10) Patent No.: US 11,977,456 B2
(45) Date of Patent: May 7, 2024

(54) FILE SYSTEM FRAMEWORK

(71) Applicant: 2236008 Ontario Inc., Waterloo (CA)

(72) Inventor: Danny Thomas Dodge, Ottawa (CA)

(73) Assignee: 2236008 Ontario Inc., Waterloo (CA)

( * ) Notice: Subject to any disclaimer, the term of this patent is extended or adjusted under 35 U.S.C. 154(b) by 105 days.

(21) Appl. No.: 15/821,196

(22) Filed: Nov. 22, 2017

(65) Prior Publication Data

US 2018/0143882 A1   May 24, 2018

Related U.S. Application Data

(60) Provisional application No. 62/425,912, filed on Nov. 23, 2016.

(51) Int. Cl.
*G06F 16/185* (2019.01)
*G06F 3/06* (2006.01)
(Continued)

(52) U.S. Cl.
CPC ........ *G06F 11/1469* (2013.01); *G06F 3/0631* (2013.01); *G06F 11/1471* (2013.01);
(Continued)

(58) Field of Classification Search
CPC ...... G06F 3/064; G06F 3/0679; G06F 3/0653; G06F 3/0688; G06F 12/0246; G06F 12/0238; G06F 13/1694; G06F 13/4072; G06F 16/13; G06F 2212/7208; G06F 2212/2022; G06F 2212/202; G06F 11/141;
(Continued)

(56) References Cited

U.S. PATENT DOCUMENTS 5,369,767 A * 11/1994 Dinwiddie, Jr. ...... G06F 9/4812
710/264
5,835,775 A * 11/1998 Washington ........ G06F 9/45504
717/153
(Continued)

FOREIGN PATENT DOCUMENTS

| CN | 104407988 A | * | 3/2015 |
| CN | 105224308 A | * | 1/2016 |
| KR | 2012-0073472 A | * | 7/2012 |

OTHER PUBLICATIONS

International Search Report corresponding to International Application No. PCT/CA2017/051409, dated Jan. 12, 2018, 4 pages.
(Continued)

*Primary Examiner* — Augustine K. Obisesan
(74) *Attorney, Agent, or Firm* — Rowand LLP

(57) ABSTRACT

A computer system includes a processor and a persistent data storage. The persistent data storage includes flash-like storage media that includes multiple contiguous memory blocks. Each of the contiguous memory blocks includes multiple contiguous memory pages. Multiple file systems executable by the processor manage file data and the file system structure of files stored in the persistent data storage. A core executable by the processor provides a common internal model and software routines that provide common functionality to each of the file systems. Some of the file systems are executable to reconstruct the one or more file systems using a plurality of transaction records that may be executed a plurality of times and always render the same effect.

25 Claims, 35 Drawing Sheets

(51) Int. Cl.
  G06F 11/14 (2006.01)
  G06F 16/18 (2019.01)
  G06F 16/23 (2019.01)

(52) U.S. Cl.
  CPC ...... *G06F 11/1474* (2013.01); *G06F 16/1847* (2019.01); *G06F 16/185* (2019.01); *G06F 16/1865* (2019.01); *G06F 16/2365* (2019.01); *G06F 16/2379* (2019.01); *G06F 2201/80* (2013.01)

(58) Field of Classification Search
  CPC ..... H01L 2924/1438; H01L 2924/1441; H01L 2924/1442; H01L 2924/1443; H01L 2924/14444
  See application file for complete search history.

(56) References Cited

U.S. PATENT DOCUMENTS

| | | | | |
|---|---|---|---|---|
| 6,018,747 | A * | 1/2000 | Burns | G06F 16/10 |
| 9,846,706 | B1 * | 12/2017 | Basov | G06F 16/17 |
| 2002/0169740 | A1 * | 11/2002 | Korn | G06F 16/1756 |
| 2002/0169923 | A1 * | 11/2002 | Chen | G06F 8/654 |
| | | | | 711/103 |
| 2004/0199566 | A1 * | 10/2004 | Carlson | G06F 16/10 |
| | | | | 709/201 |
| 2005/0251495 | A1 * | 11/2005 | Woollen | G06F 16/10 |
| 2005/0273858 | A1 | 12/2005 | Zadok et al. | |
| 2006/0218207 | A1 * | 9/2006 | Nonaka | G06F 16/1794 |
| | | | | 707/999.203 |
| 2007/0005874 | A1 * | 1/2007 | Dodge | G06F 3/0619 |
| | | | | 711/103 |
| 2007/0078914 | A1 | 4/2007 | Correl et al. | |
| 2007/0083575 | A1 * | 4/2007 | Leung | G06F 16/122 |
| 2007/0300009 | A1 * | 12/2007 | Rogers | G06F 3/0613 |
| | | | | 711/103 |
| 2008/0052329 | A1 | 2/2008 | Dodge et al. | |
| 2010/0083247 | A1 | 4/2010 | Kanevsky et al. | |
| 2010/0125697 | A1 * | 5/2010 | Lee | G06F 3/0613 |
| | | | | 711/103 |
| 2011/0107053 | A1 * | 5/2011 | Beckmann | G06F 16/1727 |
| | | | | 711/171 |
| 2011/0113207 | A1 * | 5/2011 | Fiske | G06F 16/1724 |
| | | | | 711/162 |
| 2012/0117025 | A1 * | 5/2012 | Sagar | G06F 16/184 |
| | | | | 707/610 |
| 2013/0339605 | A1 * | 12/2013 | Factor | G06F 16/10 |
| | | | | 711/170 |
| 2014/0297987 | A1 * | 10/2014 | Garson | G06F 12/023 |
| | | | | 711/170 |
| 2015/0222778 | A1 * | 8/2015 | Yamamoto | H04N 1/21 |
| | | | | 358/1.16 |
| 2017/0132044 | A1 * | 5/2017 | Kaneko | G06F 3/0631 |

OTHER PUBLICATIONS

Written Opinion corresponding to International Application No. PCT/CA2017/051409, dated Jan. 12, 2018, 5 pages.

Paragon Software Group, "Paragon for NTFS & HFS for Linux 9.0 User Manual", Paragon, dated Aug. 28, 2014, 48 pages.

Kleiman, S.R., "Vnodes: An Architecture for the Multiple File System Types in Sun UNIX", Proceedings of the USENIX 1986 Summer Conference, Jun. 1986, 10 pages.

Kahanwal, Dr. B., "File System Design Approaches", International Journal of Advances in Engineering Sciences, vol. 4(1), Mar. 2014, pp. 16-20.

Gal, E. et al., "A Transactional Flash File System for Microcontrollers", Proceedings of the USENIX Annual Technical Conference, Apr. 15, 2005, pp. 89-104.

Zadok, E. et al., "A Stackable File System Interface for Linux", LimixExpo Conference Proceedings, 1999, 10 pages.

EPO, Extended European Search Report relating to EP application No. 17873672.4, dated May 27, 2020.

John S. Heidemann et al: "File-system development with stackable layers", ACM Transactions on Computer Systems (TOCS), Association for Computing Machinery, Inc. US, vol. 12, No. 1, pp. 58-89, XP058249982, dated Feb. 1, 1994.

Erez Zadok et al: "On incremental file system development", ACM Transactions on Storage, Associate for Computing Machinery, New York, NY, US, vol. 2, No. 2, pp. 161-196, XP058106796, dated May 1, 2006.

Charles P. Wright et al: "Extending ACID semantics to the file system", ACM Transactions on Storage, Association for Computing Machinery, New York, NY, US, vol. 3, No. 2, pp. 4-es, XP058106798, dated Jun. 1, 2007.

Kaylor J et al:, "Online Layered File System (OLFS): A layered and versioned filesystem and performance analysis", Electro/Information Technology (EIT), 2010, IEEE International Conference On, IEEE, Piscataway, NJ, USA, pp. 1-9, XP031782409, dated May 20, 2010.

EP Office Action, Application No. 17873672.4 dated Oct. 15, 2021.

John A. Garrison et al.: "Umbrella File System: Storage Management across Heterogeneous Devices", Texas A&M university, ACM Transactions on Storage, vol. 5, No. 1, Article 3, Publication date: Mar. 2009.

Margo Seltzer et al.: "Read Optimized File System Designs: A Performance Evaluation", Department of Electrical Engineering and Computer Science University of California, Berkeley, CH2968-6/0000/0602$01.00, 1991.

Summons to attend oral proceedings pursuant to Rule 115 (1) EPC dated Jul. 12, 2022, EP Application No. 17873672.4.

* cited by examiner

- Small code base written in C.

| | CSS | FTS | EXPAT | PAT | ONIG | JPS-JPEG |
|---|---|---|---|---|---|---|
| New | 6,406 | 563 | 719 | 657 | 788 | 511 |
| Clinical | 16,314 | | 6,187 | 4,784 | 10,189 | 2,642 |

Lines of code

FIG. 4

| pattern | type |
|---|---|
| *.mp3 | audio |
| *.aac | audio |
| *.mp4 | video |
| *.sql | database |
| +x | executable |

| type | i/o | busy | block_size | iodepth | q_depth |
|---|---|---|---|---|---|
| audio | Sequential | 50% | 256k | 1m | 0 |
| database | Random | 50% | 1m | 100m | 256k |
| video | Sequential | 50% | 1m | 0 | 0 |
| biglogs | Sequential | 100% | 100k | 10m | 100k |
| executable | Sequential | 25% | 100k | 512k | 0 |

FIG. 7

```
usage: inotify -v -e event(s) -o option(s) -s timeout <path> ...

-v              Verbosity (add v's for more verbosity)
-e event(s)     Events to watch for. See below for valid values
-o options(s)   Options that affect the watches. See below for valid values
-s timeout      Summary report when timeout occurs
<path>          Path(s) to watch Examples:

Watch for IN_CREATE, IN_MODIFY and IN_DELETE events in /fs/ft0/testdir directory:

inotify -e create,modify,delete /fs/ft0/testdir

Watch a directory (dirname) recursively for all events:

# inotify -e all -o recurse /fs/ft0/dirname
```

FIG. 10

Options:
- -b bootfile    Write a boot loader at offset 0
- -c            Enable container support if the filesystem supports it.
- -D            Allow contents of the passed directory to span filesystems.
- -h hashfile   Save hash of .verify in this file.
- -H sigfile    Replace hash of .verify with this signature.
- -l            Disables detection and handling of hard linked files.
- -p file       A patch file to patch perms, uid, gid and zone.
- -r            Create a readonly filesystem.
- -s n[k|m|g]   Size of filesystem. Default: Just enough to hold the files.
- -t type       Filesystem type (ftfs, qnx6, exfat, fat, hfs). Default: ftfs.
- -v            Verbose. Multiple -v's increases verbosity.

FIG. 12

- Empty lines and lines which start with a '#' are ignored
- Lines which start with a : are settings which are then applied as operations to directories and files. There is typically one settings line followed by one or more operation lines.

:settings
  !operation
  !operation
  :settings
  !operation

- A settings line consists of a setting separated by a commas. A setting without an '=' unsets it so it is not applied.

uid=ddd      Set the uid to the decimal value
  gid=ddd      Set the gid to the decimal value
  perm=oooo    Set the file perms to the octal value
  dperm=oooo   Set the directory perms to the octal value
  zone=d       Set the zone to the decimal value (0 - 9)

- An operation line consists of flags followed by a path and an optional pattern.

flags "path" "pattern"

- The following flags are defined r   Recursive. Walk through all files under this directory which match the given pattern.
  f   File. Operate on files.
  d   Directory. Operate on directories.
  p   Prune. Remove files/directories operated on.
  c   Create. The path will create a file (f) or directory (d). It will be empty.

FIG. 13

| Mkfs utility | Filesystem | FFS ONX6 EXFAT FAT | | | | Notes |
|---|---|---|---|---|---|---|
| Created if not RO. | Created on mount if not RO and the file does not exist. | yes | yes | yes | yes | If this directory does not exist it is not possible to unlink an open file. |
| Created if not RO | Created on mount if not RO and the file does not exists and filesystem supports | yes | yes | no1 | no1 | If this file does not exists transactions are played through a memory buffer |
| Created if not RO. | Created on mount if not RO and the file does not exists and filesystem supports | yes | yes | yes | no2 | Only ffs supports a key per file per domain. |
| Created if not RO and the -c container option is specified | Never creates. | yes | no2 | no2 | no2 | Currently uses the GID as an ID but should probably have its own |
| Created if the -K key option is specified | Never creates. | yes | yes | yes | yes | Filesystem is treated RO if this file exists. |

1. Possible with enhancements to super block
2. Possible with enhancements to directory entry

FIG. 14

| File | File source directory | File destination directory | Notes |
|---|---|---|---|
| fap | NULL | NULL | Update attribute. Typically size or mappings. |
| fap | srcdir | NULL | Update attribute and parent directory. Happens on create, nlink change or directory size if directory was grown. |
| fap | NULL | dstdir | Create a hard link. |
| fap | srcdir | dstdir | Move to another directory |

FILE SYSTEM FRAMEWORK

CROSS-REFERENCE TO RELATED APPLICATION

This application claims priority under 35 U.S.C. § 119(e) to U.S. Application Ser. No. 62/425,912, filed Nov. 23, 2016, entitled Flash Transaction File System, the entirety of which is incorporated by reference.

BACKGROUND OF THE INVENTION

1. Technical Field

This disclosure is directed to a file system and in particular to a file system framework for use in a computer, an embedded controller, or the like.

2. Related Art

Computers, embedded controllers, and other microprocessor-based systems rely on application programs to interact with hardware components. Many systems run operating systems that provide the interface between the application programs and the hardware. File system software may be part of the operating system, or it may be ancillary to it. In either instance, the file system software organizes the data within memory used by the processor and the application programs.

There are many ways to implement a file system. For example, a transaction based file system is one in which the file system is maintained in a consistent state since all updates to the file system structure and the data are logged as transactions. More particularly, all updates to the file system are made as transactions, and the contents of the file system can be manually re-constituted by successively applying all of the transactions that have been committed.

A transaction is either committed in a transaction file or it has not been completed. If the operation of the file system is interrupted, such as due to a power outage, for example, the state of the file system cannot be dynamically restored, as the transaction file is usually only a data collection of the events. While some transaction file systems may be used to manually restore a file system, the transaction file systems do not dynamically restore the file system.

BRIEF DESCRIPTION OF THE DRAWINGS

FIG. 4 shows the comparable sizes of the disclosed file systems and the core compared to current systems.

FIG. 7 shows rules that may be applied to file handles for memory allocation.

FIG. 10 is a syntax for an inotify utility.

FIG. 12 shows the syntax and options for a utility that will format and generate a Flash Transaction File System (FTFS).

FIG. 13 shows the syntax and options that modify, update, and/or transform the data or designations that are part of the FTFS.

FIG. 14 shows a plurality of attributes that the generator can set on a file system that will modify the behavior of the file system framework.

FIG. 15 shows functions associated with the file attribute pointer.

FIG. 16 shows two transactions.

FIG. 17 provides implementation details of transaction commands.

DETAILED DESCRIPTION

A file system framework (or architecture) allows users to write file systems with ease. Based on the use of shared objects, the framework supports mountable entities including virtual file systems. The framework supports a new FTFS designed for a Solid State Device (SS) such as flash or flash-like media that supports transactions, space accounting, encryption, extended mappings in the inode, inode updates with a single input and output (IO or I/O), hard and soft links, access control lists, and sparse file support. The framework also supports other file systems including File Allocation Tables (FAT), Extended File Allocation Tables (EXFAT), Unix-like file systems like QNX6 file systems, and file systems developed by Apple Inc., such as a Hierarchical File System (HFS) Plus or HFS+, and others.

Figure 1:
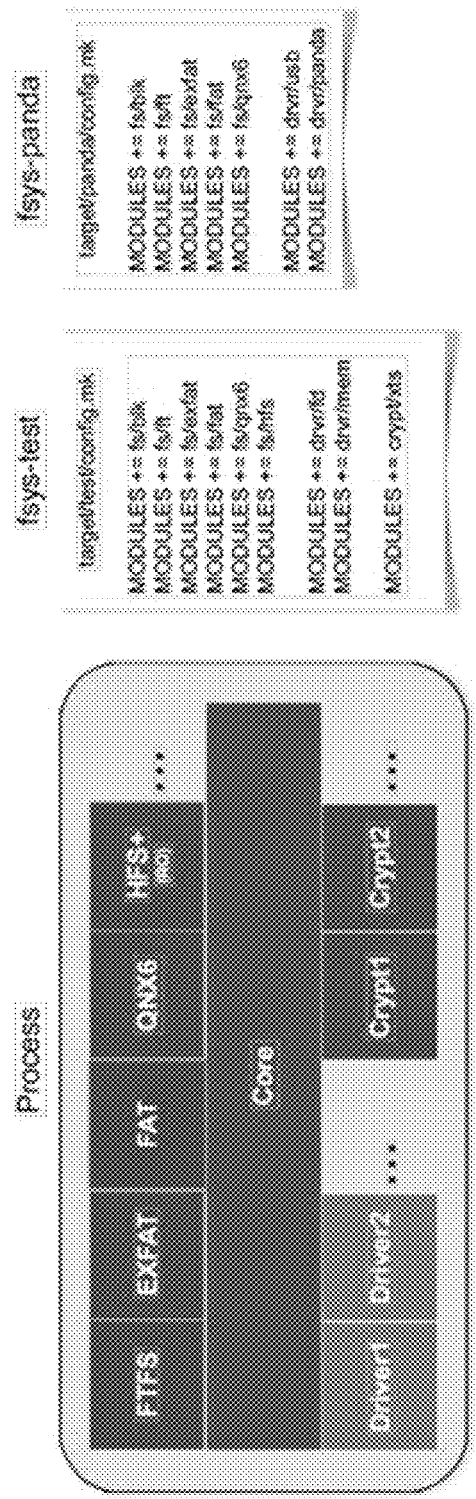
FIG. 1 is a block diagram of a file system framework.

As shown in FIG. 1, the architecture employs a common core (Core) framework that processes any object that is shared by one or more file systems. The Core supports one or more drivers depicted as Driver1, Driver 2, etc., such as Advance Host Controller Interface (AHCI) drivers, Multi-Media Card (MMC) drivers, and one or more cryptographic libraries or modules depicted as Crypt1, Crypt2, etc. which can provide support for cryptographic accelerators. In some systems and processes (collectively referred to as system(s)) all of the file systems and drivers are shared objects and dynamically linked in some systems, are static linked to speed boot time (no need to resolve and load shared objects) in some systems, and a combination of static linked and dynamically linked in other systems. In all of these systems, more functionality is moved to the Core from the file systems, which provides a common internal model that allows file systems with rich features to be coded in a small number of C lines of code. In some systems, a specific set of file systems and drivers are enabled, which results in a single executable file, having a single pre-set configuration file and a single set layout. In some systems, the file system framework is available with shared objects that are compatible with existing device (dev) drivers. In FIG. 1, fsys-test and fsys-panda configuration files are examples of build files that select different file systems and layouts (e.g., fs/) and different drivers (e.g., dvr/, crypt/, etc.).

Figure 2:
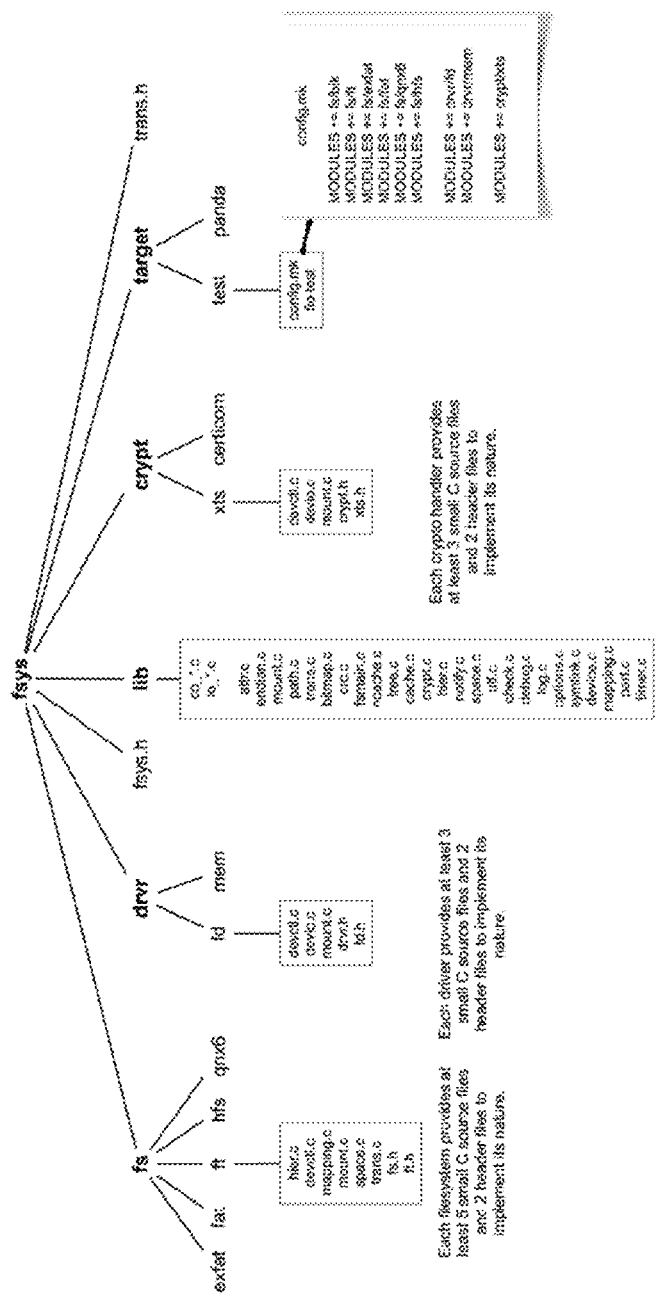
FIG. 2 represents the code structure of a virtual file system framework or architecture.

FIG. 2 represents the source code and directory structure of the file system framework. It represents where the file system finds source code files. The file system architecture has a top-level directory fsys, and the file systems (fs), drivers (drvr), file system header (fsys.h), a file common library (lib), a cryptography (crypt) handler, a target, and a transaction header (trans.h). Beneath the target folder, a directory for each configuration file is established. The Core provides a common internal model for all of the file systems to use and the common source files and a common library that provides a rich set of routines and functions for all of the file systems. The Core is much larger than the other entities that comprise the file system framework of FIG. 1, as there is more code in the common library resulting in less or no duplication of functionality between the file systems. Each of the file systems call on the rich set of routines and functions as needed. Each file system, each driver, and each crypto handler, for example, may provide at least five small C source files and two header files to implement its respective nature.

Figure 3:
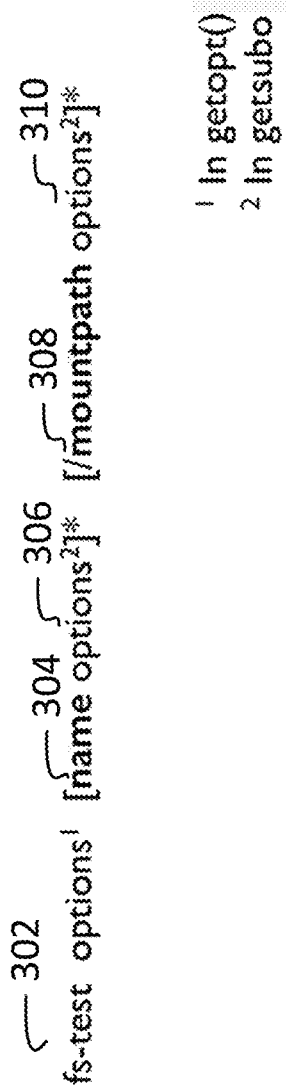
FIG. 3 shows a command line process.

The file system framework provides command line processing when launching a program on a device. The command line options can provide different options per mount path. FIG. 3 shows the example syntax of what a command line looks like when utilizing the command line. In FIG. 3, the first instance of options 302 is global to the file system framework. The name field 304 refers to the file system or driver (e.g., blk, ft, fat, exfat, universal serial bus (usb), etc.). If the name is "fs", then the command line establishes that the first instance of options are common options across all of the file systems. The second instance of options 306 is global to the named file system and effects all mounts of the particular designated file system. The mount path field is the name of the mount path for a file system (e.g., /, /media, /fs/usb). The second instance of options 310 apply only to a single mount point. In FIG. 3, only one set of options is applied to a file system and it adheres to the following priority: 1. mount options specified by the mount utility; 2 the mount options specified by /mountpath; 3. the options specified by name; and 4. the global file system options specified by name "fs".

FIG. 4 shows the comparable sizes of the disclosed file systems and the Core compared to the others in one framework. Here, a number of lines of code for each file system shrinks because functionality is shifted to the Core.

Figure 5:
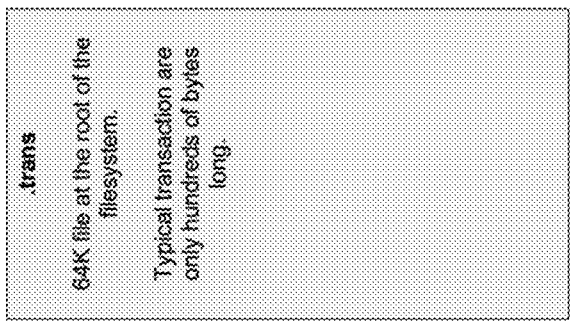
FIG. 5 is a representation of a transaction file.

In file systems, the term transaction generally comprises a modification which is atomic with respect to power loss. Put another way, if interrupted by power loss, the modification will be either fully rolled-back or fully completed. If a file system framework loses power, a transaction system Application Programming Interface (API) or feature built into the Core recreates the file system framework instance that was built before power was lost. The file system framework does not lose data. In conventional systems, an fsync command pushes all the data to the hard drive from all of the files that have been changed since the last sync command. This causes a large amplification of data and costs the file system framework the processing time of a very long operation. In the disclosed file system framework, the fsync function is executed on a file-by-file basis avoiding the bottlenecks caused by a global synchronization function. A transaction, in one example, may be hundreds of bytes long. The transaction system can be executed on all file systems, regardless if their on-media format supports such recovery. In the time between the power loss, and when the Core completes reconstruction, the on-media format is incompatible with the file systems specification (e.g., EXFAT/FAT/HFS). FIG. 5 is a representation of an example transaction file.

Figure 6:
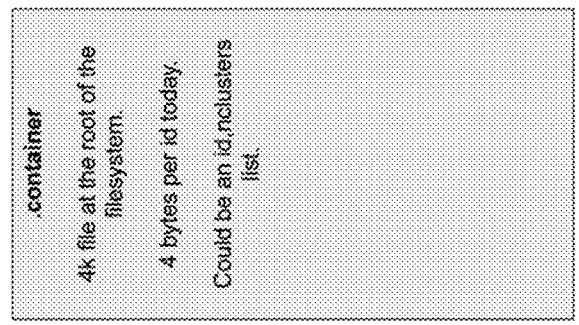
FIG. 6 is a representation of a container file.

FIG. 6 is a representation of an example container. A container system is built into the Core to provide all file systems that support container functionality with access. A container may be designated by adding bits to the directory entry establishing a container identification (id). In the file system framework, by default, up to 1024 containers may be used, which establishes the maximum space that may be allocated by the file system framework. Container identifications (ids) are assigned on a file-by-file basis and are inherited by the parent directory. The containers may be used for an application sandbox or a user across all applications. In some file systems, such as an FTFS, the file system may use the file's Global IDentification (GID) as its container id. Containers provide for disk space quotas on a file granularity.

The features of the file may be processed to establish preliminary storage allocations and storage techniques in FTFS. It allows the file system framework to avoid fragmenting files. Fadvise and pathname command allows an application to tell the FTFS how it expects to use the file handle, so that FTFS may chose the appropriate read ahead and memory allocation techniques. The rules shown in FIG. 7 are classified by file handles. The rules establish the type of storage that is expected to be consumed, and establish the expected grow sizes relative to the current size that is enforced from the upper and lower grow-by boundaries. The rules may be read by an application from a text file at startup of the file system framework.

Figure 8:
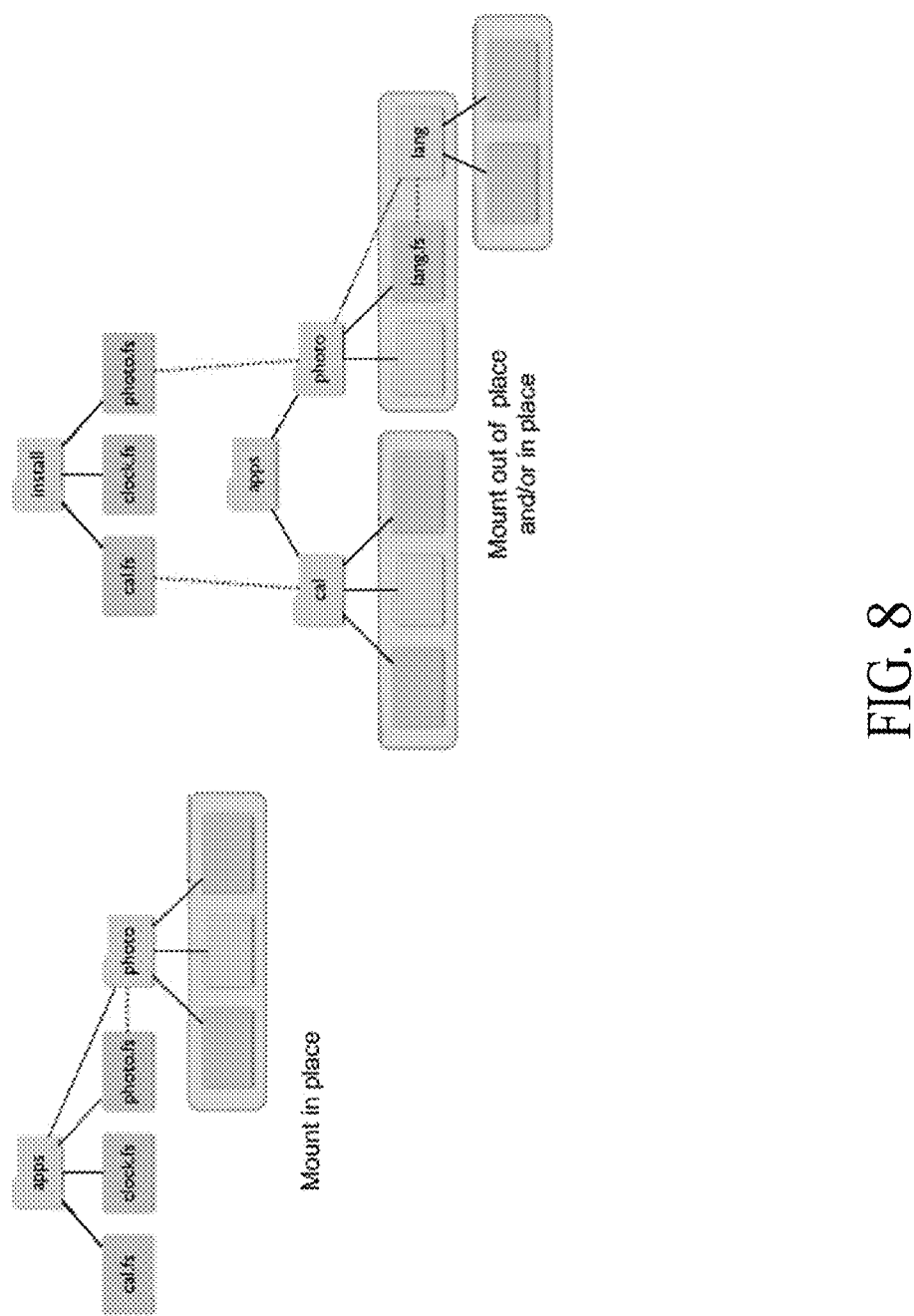
FIG. 8 represents a depth supported by the flash transaction file system.

The FTFS supports nesting file systems within file system files as shown in FIG. 8. Any mix and depth may be supported and may be mounted as a repository. The FTFS mount quickly applies permissions through User Identifiers/Group Identifiers (UID/GID) that may be applied to mount all files. As a result, the FTFS may mount and unmount files via a large sequential write or deletion functions instead of on a random file-by-file basis. This increases the speed of the install/uninstall process.

Figure 9:
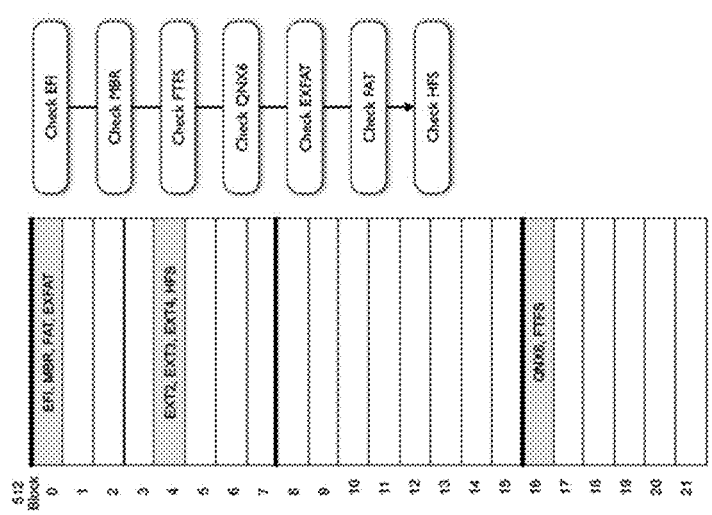
FIG. 9 is a partition table and a process for detecting file systems when auto mounting.

The mounting, auto mounting, and optional mounts executed by the Core uses a partition table (e.g., FIG. 9) to break up a device (or flash/flash-like memory) into multiple file systems. The Core can support Extensible Firmware (EFI), Master Boot Records (MBR), no partitions, etc. In use, the Core discovers the partitions on each device, detects media (e.g., a USB drive or stick) coming and going, and invokes internal mount and umount functions. When an auto mount is invoked, option mount functions that may be identical to the hard drive designate one or more file systems to be moved to the hard drive and/or add any other option to the auto mount command line. For file systems, the Core knows the locations of the blocks of data that hold the file systems. Thus, to prevent false matches on an auto mount command, when reformatting a partition or adding a partition to a device that does not have a partition, the file system may sequentially check file system blocks in any order including from the highest block to the lowest block as shown by the process flow in FIG. 9. As shown, the process flow sequentially checks for a file system from the highest block to the lowest block.

The file system framework also includes a command line utility in its Core called inotify. The inotify utility acts to extend file systems to notice changes to the files system, and report those changes to requesting applications. The inotify utility may be added as a recursion on any directory providing the directory with the ability to call the utility itself and enables an implementation including implementations with small (about 40 lines of code) software routines. This implementation is efficient with no code residing in the Core. Unlike other functionality, the utility is less complicated and not error prone. An example syntax for the inotify utility is shown in FIG. 10, with examples for creating, modifying, and deleting events.

Figure 11:
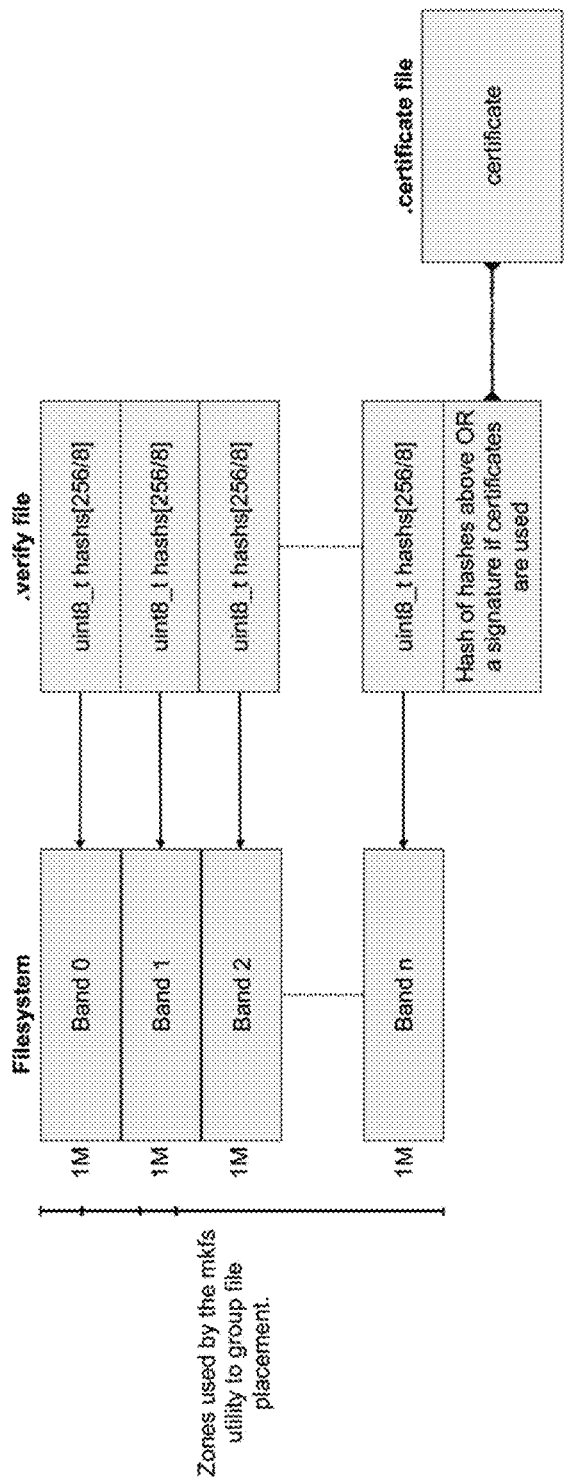
FIG. 11 represents the bands and zones of the file systems being subject to an integrity check.

The file system framework also supports integrity checking of all file systems. One such integrity check is executed through the cryptographic checking of file systems. In the file system framework, an entity sits between a file system and a physical device that intercepts all of the requests for the file systems that request memory blocks from a device. This is known as demand check. As the file systems requests files, it reads them along with their cryptographic checks, such as a SHA cryptographic hash value. The file system compares the hash to a known signed hash to ensure no modifications occurred to the file system. The integrity check includes a certificate file that includes the verified hash values corresponding to verified files. In some implementations, each hash value is 256 bits long, and when a SHA-2 cryptographic cipher is executed, renders thirty-two bytes per instance. In FIG. 11, memory bands are broken up into one-megabyte sections and zones are broken up into variable memory lengths. When a file system touches any part of a band and requires an integrity check, the integrity checking utility must check one-megabyte if operating under a band integrity, or if a zone integrity is specified, a variable length is verified. When the images of the zones or bands are signed with a hash value, integrity may be pre-checked exclusively or in addition to a demand check. On any verification error, some file system frameworks will unmount the compromised bands or zones by rule or on the detection of a condition. The checking policy (demand/pre-check) can be set on a zone-by-zone basis.

FIG. 12 shows the syntax and options for a utility that will format and generate the FTFS shown as the mkfs utility or mkfs tool. In known systems, such as the QNX file system, the utility requires 2,207 general lines of code and 1,224 line of code specific to the QNX file system functionality. The disclosed utility has a significant reduction in code as it has 520 general lines of code and 268 lines specific to FTFS. The disclosed utility processes a text file as an input and builds a populated FTFS. The text file may specify the layout of the file system, how many blocks of memory it requires, what files and directories it will create. In practice, a developer will generate (or copy) all of the files the FTFS should include and a directory that provides access to a subtree. When mkfs is called and pointed to the directory, the FTFS is generated. In some systems, the mkfs utility may not include the build parsing logic common to known utilities. Nonetheless, the mkfs provides the capability to create an empty file system or replicate a directory to instantiate the file system. It supports containers, hash verification across all file systems, and file placement via zones to cluster files, and directories that together improves boot speed.

FIG. 13 shows the syntax and options that modify, update, and/or transform the data or designations that are part of the FTFS once the file system is generated. In the code, empty lines and lines which start with a "#" are ignored and lines which start with a ":" are settings which are then applied as operations to the directories and the files.

There are a set of files created in the root that the file system framework is aware of. These files may be created by the mkfs utility. However, some file systems themselves may create the files if they are missing such as a USB stick which was formatted with a tool other than mkfs (example Windows). The modularity and adaptability provided to an integrator allows near transparent support for features across the file systems without having to modify or supplement their super block etc.

A system integrator can set these as an attribute of the file system when it is generated. FIG. 14 shows a plurality of attributes that the mkfs tool or the generator can set on a file system that will modify the behavior of the file system framework when interacting with a particular file system. Some example file systems are shown FTFS, QNX6, EXFAT, and FAT. As shown, the utility is not relevant to all file systems but generally to many. For example, if an integrity checking is missing from a file system, a minus k (−k) command option in the mkfs utility adds such verification when the mkfs is launched. The −k command takes an argument of keys, which will be cryptographic keys that will allow each of the designated file systems through its super-block to verify the integrity through a certificate when the file system is created. A superblock is a record of the characteristics of a file system, including its size, the block size, the empty and the filled blocks and their respective counts, the size and location of the inode tables, the disk block map and usage information, the size of the block groups, and in some instances, where a system can find file system meta data.

If a file system supports containers and the file system is not Read Only (RO), the minus c (−c) command is a command line option that provides container functionality in some file systems as shown in FIG. 14. Both the .verify and .container functions are added by the mkfs tool and cannot be automatically created if not generated when the respective file systems are generated. This is also expressed in FIG. 14 under the Filesystem heading. The .crypt file handle that provides password encryption to the file system may be created when the file system is generated (e.g., mounted), or if not RO file system and the file system supports encryption, the integrator adds or enables the cipher functionality after creation on a file-by-file basis. The .tran file handle indicates that one or more of file systems protect their file system structure consistency through "transactions" (log, modify, commit). It is file system agnostic in the file system framework. Use of transactions allows the file system to be reconstructed in the event of failure, leaving the structure of directory, files and metadata in a pre-crash state, as well as increasing the chances of successful recovery in the event of a hard failure. Unlike some older file systems (e.g., FAT) that may require a manually triggered repair operation after a software failure occurs to ensure their consistence, some file systems, like the FTFS, automatically recovers through a journaling layer also referred to as a transactional file system. In FTFS, transactions may be created on mount if the file system is not RO and the file system supports it. The unlinked file handle indicates that the file system supports a system call and a command line utility to delete files. The unlinked functionality may be created on mount if the file system is not RO and the file does not exist as shown in FIG. 14.

As explained, the file system framework supports the transactions on a file-by-file basis. It does so by modifying the inode/mappings via the meta data in the framework. Although inodes will be stored in a particular way via a global resource such as storage, its storage varies with each file system. Before a file system writes a file transaction, the storage must succeed or the file system writes nothing. In some file systems like FTFS, the transaction can be replayed "n" times and create the same effect making the recovery idempotent. Thus, the number of times a file system is subject to a crash loop has no effect on recovery. In the event of a dirty transaction (e.g., a failed transaction), the Core library may be used to restore the file system. The transactions add a transparent layer that the file system may not be aware of. It operates on up to three entities: trans(fsattr_t *fap, fsattr_t *srcdir, fsattr_t *dstdir). Those entities are the File Attribute Pointer (FAP) that points to the memory representations that are modified, the source (src) directory (dir), and the destination (dst) directory. In FTFS, attributes are updated and stored in the transaction file through an API. The attributes include a valid pointer to the FAP. Updates to attributes and the parent directory occur by identifying only the source directory as shown in the table of FIG. 15. A hard link is created or access time is updated when only the destination directory is identified and FAP is moved to another directory when the source directory and the destination directory are identified.

Figure 16:
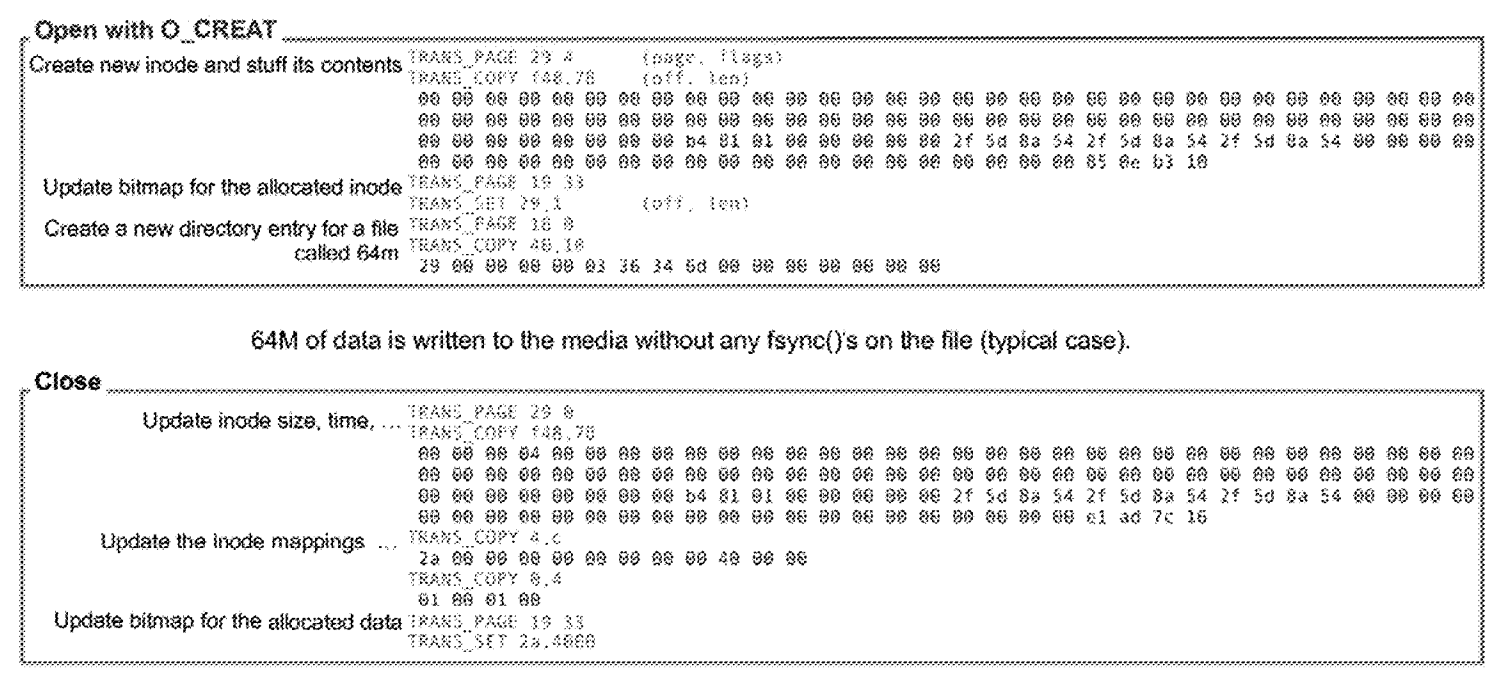

FIG. 16 shows the syntax of two transactions to store a file called 64M for replay later. The 64M file is written to the media without any sync command pushes. The O_CREAT command creates the inode and stuffs it content. O_CREAT then updates the bitmap of the allocated node, and creates a new directory entry for the file 64M. The Close operates similarly. Close commands update the size of the file, its modification time, and a binary information layout of the information. The Close command then updates the inode mappings to the real data blocks allowing it to find where the data is located on disk and then updated the bitmap for the allocated data. If a close command does not follow the O_CREATE command, the file will be seen, but it will be zero bytes in size. Accordingly, it takes two separate activities to create the 64M file.

Figure 17:
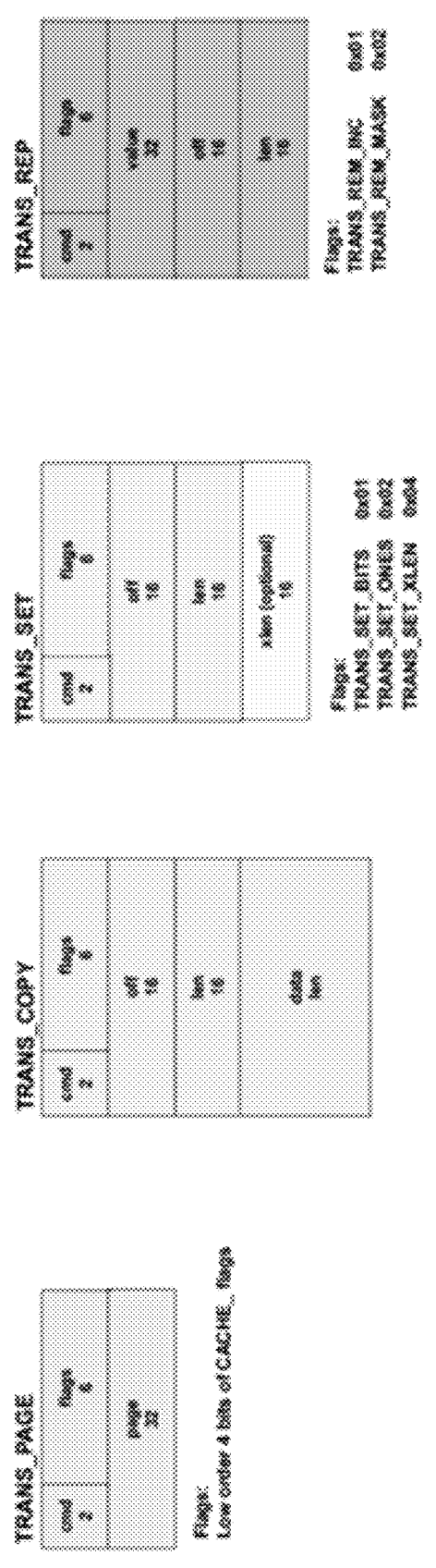

FIG. 17 provides implementation details of transaction commands. The TRANS_PAGE command loads a 4K page from the media, in which all subsequent commands apply to and operate on that page. If a new page is to be issued, the current page is saved before loading. The TRANS_COPY command copies data from the current page into memory. The TRANS_COPY command reads the previously stored page, add the new 4K page to it, and then writes it back to memory. If a file system is RO or Write Only (WO), no changes are made. The TRANS_SET operation sets bits or bytes to zero or a one in the current page in memory. If xlen/len (size) exceeds a page the current page is saved and the next page loaded. The TRANS REP replicates the thirty-two bit value into the current page in memory. It has the option to increment the value or mask the top four bits. The transactions are designed to be replayed as many times as needed and produce the same effect.

Figure 18:
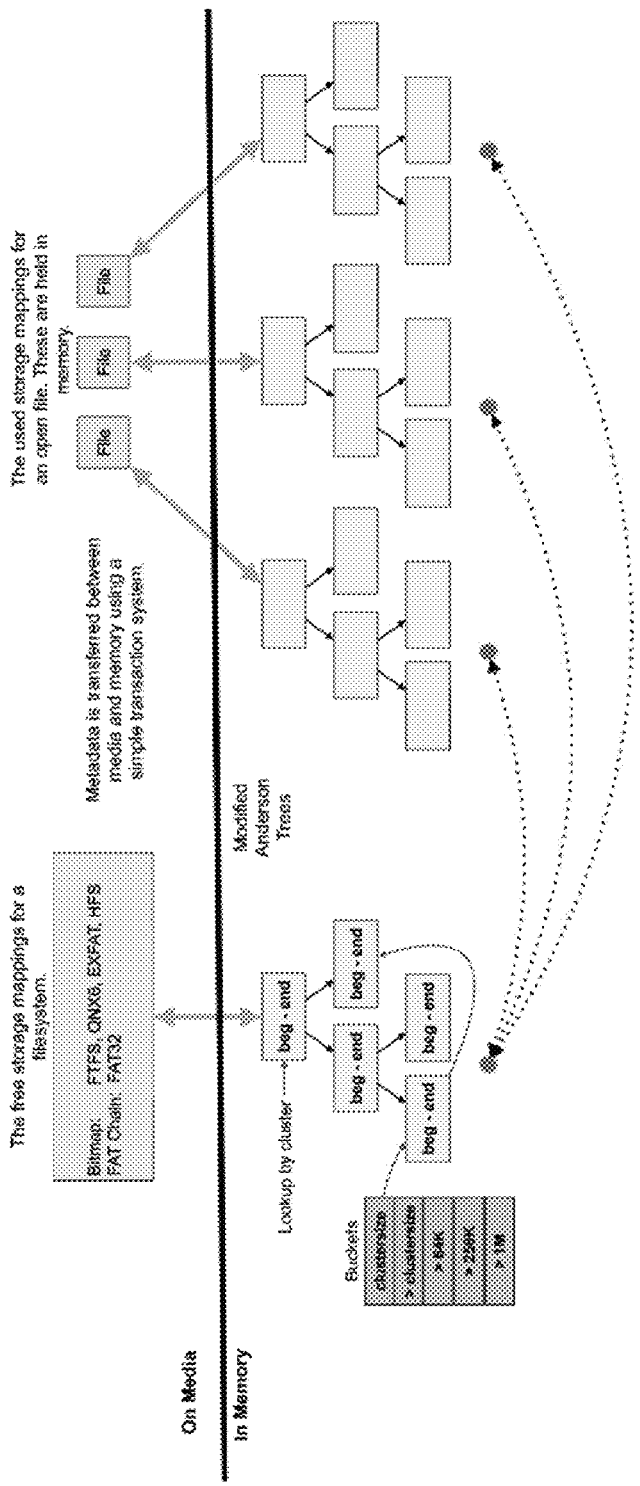
FIG. 18 shows the relationship between data structures in memory with files on disk.

FIG. 18 shows the relationship between data structures in memory with the files stored on media or disk. Many file systems are concerned with defining what data looks like on disk and in memory. In FIG. 18 the files in the free storage mapping is shown above the software that tracks changes in the free space and localized space changes per file. The tracking and look-ups are similar to a global profile system that also tracks changes and memory use at the file system level. As all of the free storage space is consumed, the file system framework moves the open files from the media to memory configured as a modified Anderson tree shown on the right of FIG. 18. Mappings are moved between the trees as files grow and shrink and include metadata associated with those files. Similarly, metadata is also transferred between media and memory when transactions are executed.

Figure 19:
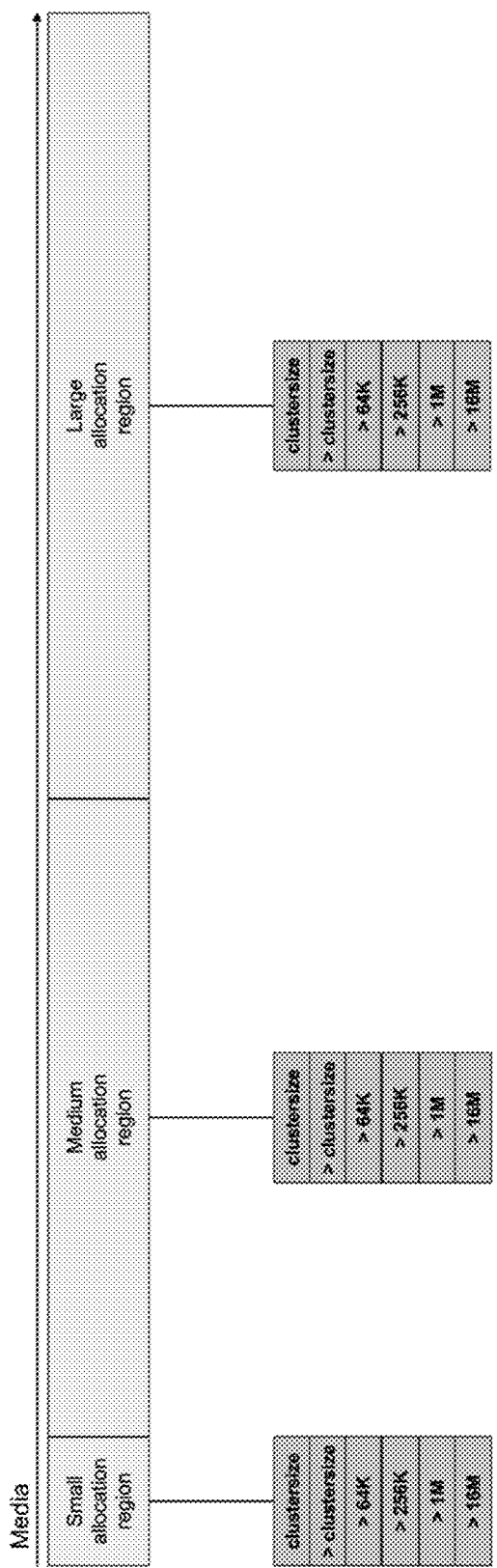
FIG. 19 shows an allocation storage strategy.

FIG. 19 shows an allocation storage strategy employed by an allocator in the Core. When an allocator knows the size of the file such as by file handles as shown in FIG. 7, it attempts to allocate space into one of three areas: a small allocation region, a medium allocation region, and a large allocation region based on size or rules. An example rule list is shown in FIG. 19. When an allocation is attempted, the allocator first attempts to grow the storage contiguously by looking it up via the modified Anderson tree of FIG. 18. Should that fail, the allocator selects a region based upon the request size, which in some instances includes the expected growth size of the file types. This has the effect of grouping similar sized requests in the same region.

In FIG. 19, space is added into the small allocation region, the medium allocation region, or the large allocation region bucket list based upon its starting position. A small allocation region is for single cluster requests, while the large allocation region is for >1 M requests, with everything else placed within the medium allocation region. Space is not combined across regions. The width of each region may be defined as a percentage of total disk space, for example 10% 60% 30% of disk space. In FIG. 19, an empty media region will typically have three large memory extents with one large extent occupying the largest bucket in each region.

Figure 20:
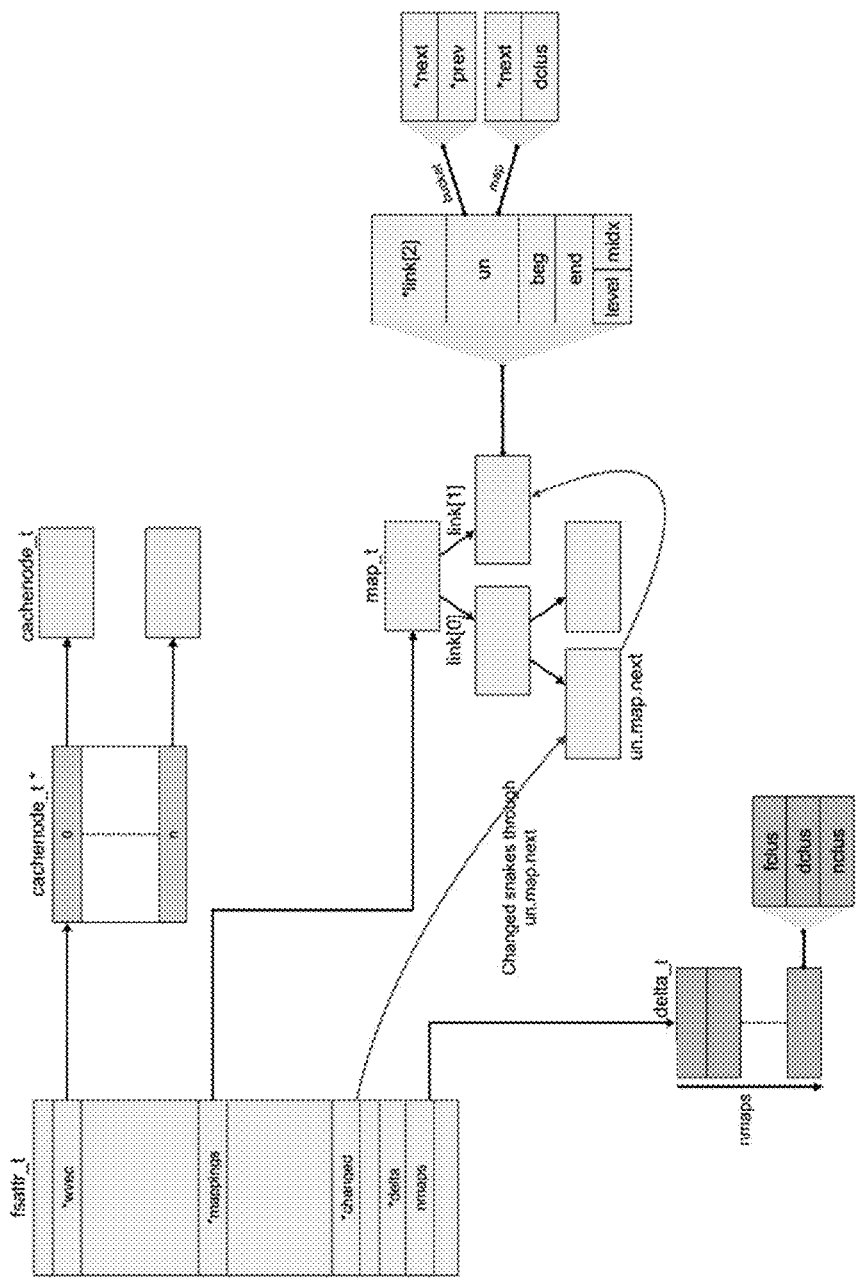
FIG. 20 shows file mappings.

FIG. 20 shows file mappings. The mappings track where data can be found. When a file system opens a file, it must first locate the file by accessing the file mappings that identify its location on disk. Once the file is open and read, a close or sync command causes the file system to write out the data that may be stored in different locations. A change list and deltas are generated that reflects how the mappings are to be changed, so if there is a need to unroll something, the file system framework has all the records it needs to know how the system modified the global free space. When a snapshot occurs (closing out a transaction), the system processes all of the changes and applies them to the undisk structure and updates the map. The resulting storage changes are the direct result of operations on files (which includes directories). By tracking changes on a file-by-file basis, the sync command uses fewer resources as it only needs to store one file. By applying deltas to the global free space, the file system updates only part of the global free space not its entirety conserving processing resources.

FIG. 20 presents mappings that may apply to any file system. When a transaction is written, the system can recover the transaction, and the transaction can be written to the desired system's format. In FIG. 20, *wvec (WVEC) holds an array of modifications that belong to the disk file. Rather, than the cache owning all of the modifications and the records showing which file each page belongs to, this file mapping turns it on its head. In FIG. 20, WVEC holds the data written to the file that is now in cache. It is the bulk of pending data that has yet to be written. The *mappings holds the pointers to the storage locations where the data is going to go; here, mappings belong to the file. Mappings are updated as the file is grown or shrunk. These are loaded on an open and saved on a sync or close. The *delta holds the changes that has to be applied to the allocation map to bring it up to sync with the file. They are the changed list or deltas that can be used to update mappings for the file and the global free space. Any pending data in *wvec is committed first. The system stores the deltas as an easy way to patch the global allocation with only the changes that are relevant to a particular file. The nmaps are a count of how many changes there are.

Figure 21:
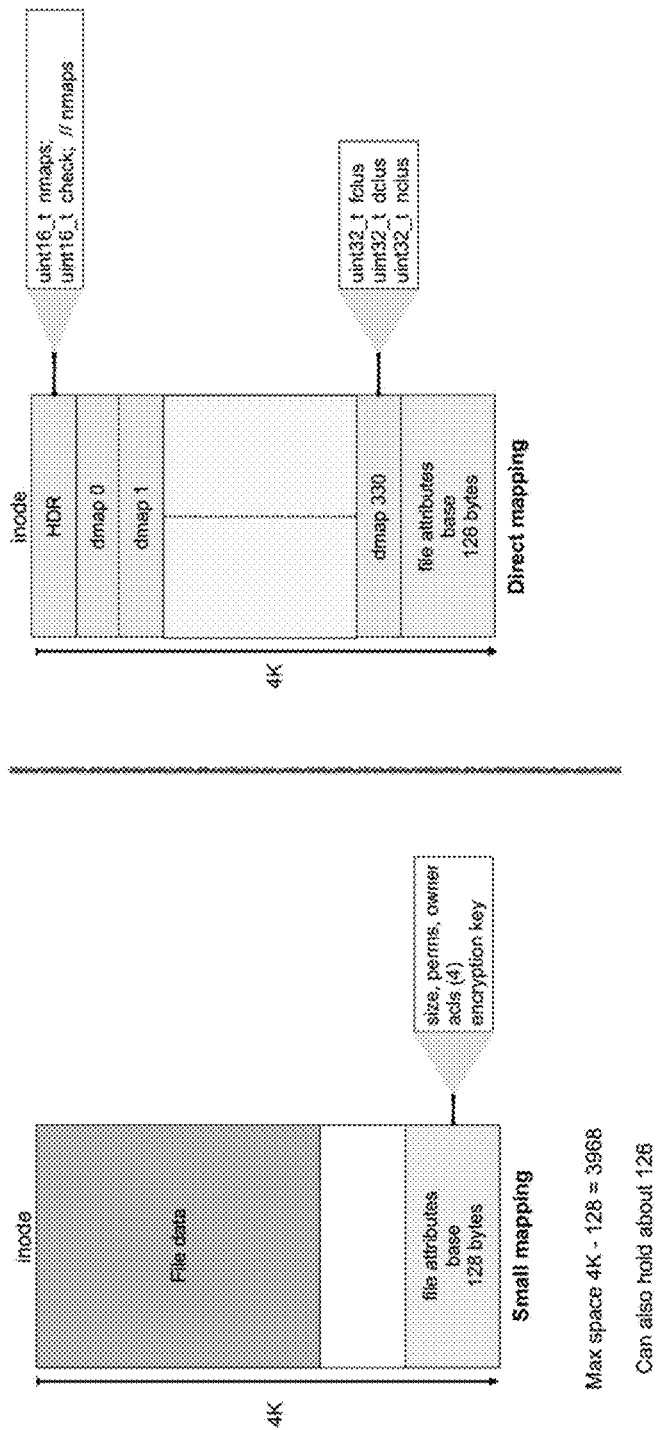
FIG. 21 shows a representative FTFS inode.

FIG. 21 shows a representation of an FTFS index node called an inode. The inode is a 4K data structure that stores some metadata about each file such as its type, file, access/change/modification/deletion times, owner, group, and so on (not including file names though). The inode on the right side of FIG. 21 has up to 330 direct mappings or 126 directories, where each direct mapping refers to a continuous segment of a cluster with 128 bytes reserved for the more basic information about the file. The inode on the left side of FIG. 21 shows many smaller files of constant or variable length may be stored directly in the inode to conserve memory.

Figure 22:
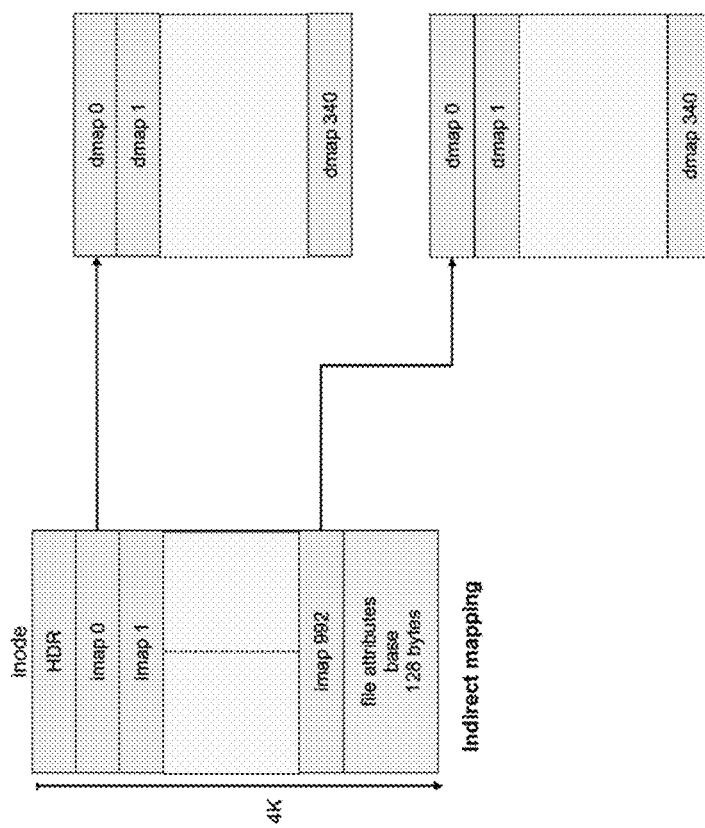
FIG. 22 shows a second representative FTFS inode.

FIG. 22 shows an alternate representation of a larger FTFS inode that points to secondary maps that are known as indirect maps. In FIG. 22, the inode has 992 pieces for 340 direct maps shown in FIG. 21.

Figure 23:
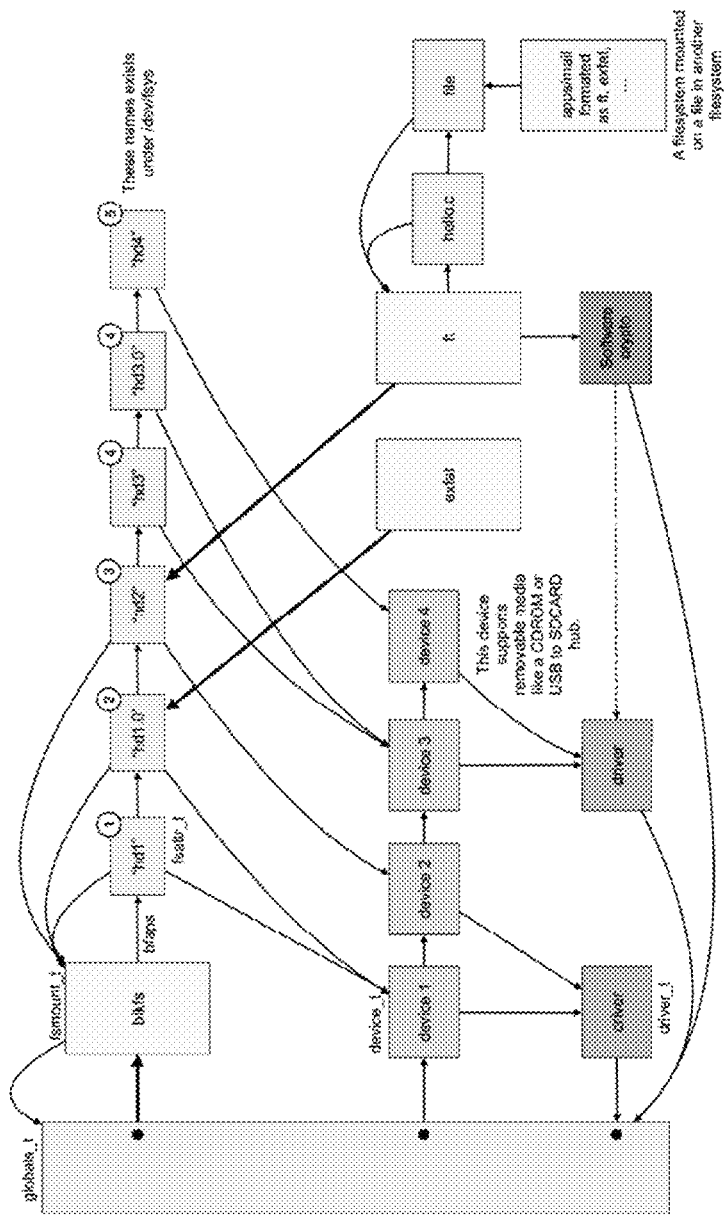
FIG. 23 is a high-level representation of how the file system framework fits together.

FIG. 23 is a high-level representation of how the file system framework fits together. This refers to in memory data structures. For each running program, there is a global structure (e.g., globals_t) that is linked to a mount structure (fsmount_t) that stores all of the devices for the file system you are accessing. In FIG. 23, the devices are the hard drives (e.g., hd1, hd2, hd3, and hd4) and/or partitions on the hard drives (e.g., hd1.0 and hd3.0). There are four physical hard drives and two partitions in the example representation. In FIG. 23, the blkfs record all the file systems that are available. There are six file systems pointing to four devices in the example representation. It is a many to one mapping. In FIG. 23, each of the file systems points to the device it sits on top of: hd1 and hd1.0 point to device 1, which points to a driver, which refers to a type of disk. The first three (hd1, hd1.0, and hd.2) are on a rotating hard drive and the remaining three are on a flash or flash-like device. From the file system, ft has a hello.c file and a file serving as a host for a nested file system that could be ft, exfat, etc. The file system (ft, exfat, etc.) resides within file, that resides within file hello.c that resides within the file system ft that resides within hd2 that resides within device 2.

Figure 24:
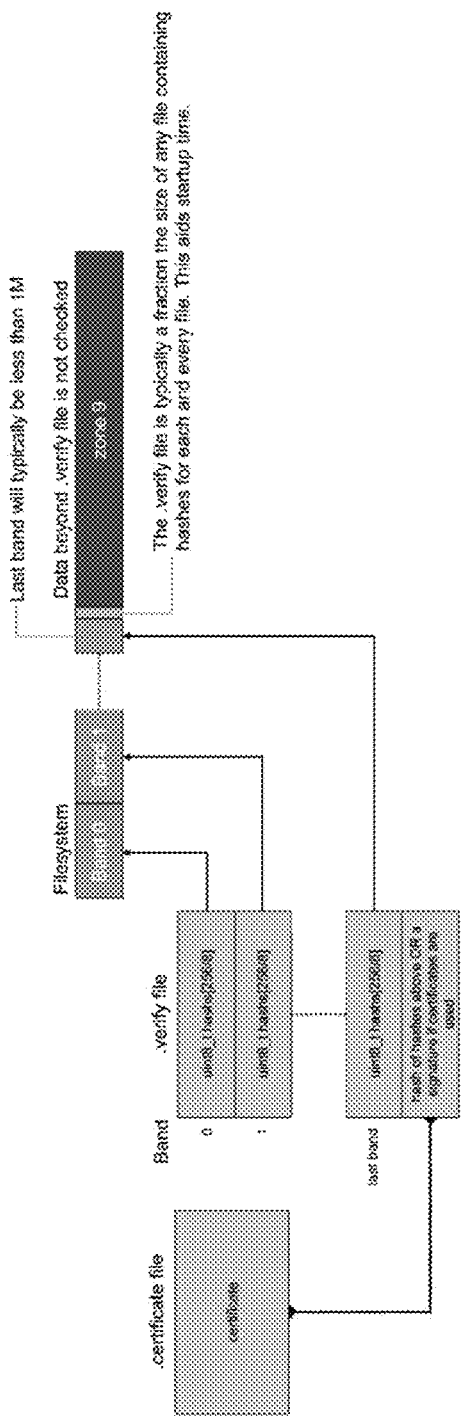
FIG. 24 represents the security of a file system.

FIG. 24 represents the security of a file system to ensure it is not tampered. It shows the hash and the certificate showing how the file system framework breaks up the partitions underneath the file system. It is limited to a RO file system because the system cannot update the certificate on the device or as frequently as the system might write to disk. The file system is broken up into 1M bands, so every time data is touched anywhere in that band, you read the whole band and compare to the hash or if it is done pre-mount, the system scans the whole disk at once. When building a file system image using the mkfs utility, the design can assign files up to a threshold number such as 10 zones (0 . . . 9), for example. This allows the system to cluster files that may need to be accessed early or together into similar bands and establish different levels of verification (e.g., some zones may be pre-verified, some verified on demand, some are never verified such as zone 9 or verify up an occurrence of an event, etc.). FIG. 24 shows the use of hash values with certificates, that does crypto-verification, and dividing the file system up into fixed length bands that may be aggregated into variable length zones where you can set policy. The policy may verify by a combination of certificates, signatures, and hashes.

Figure 25:
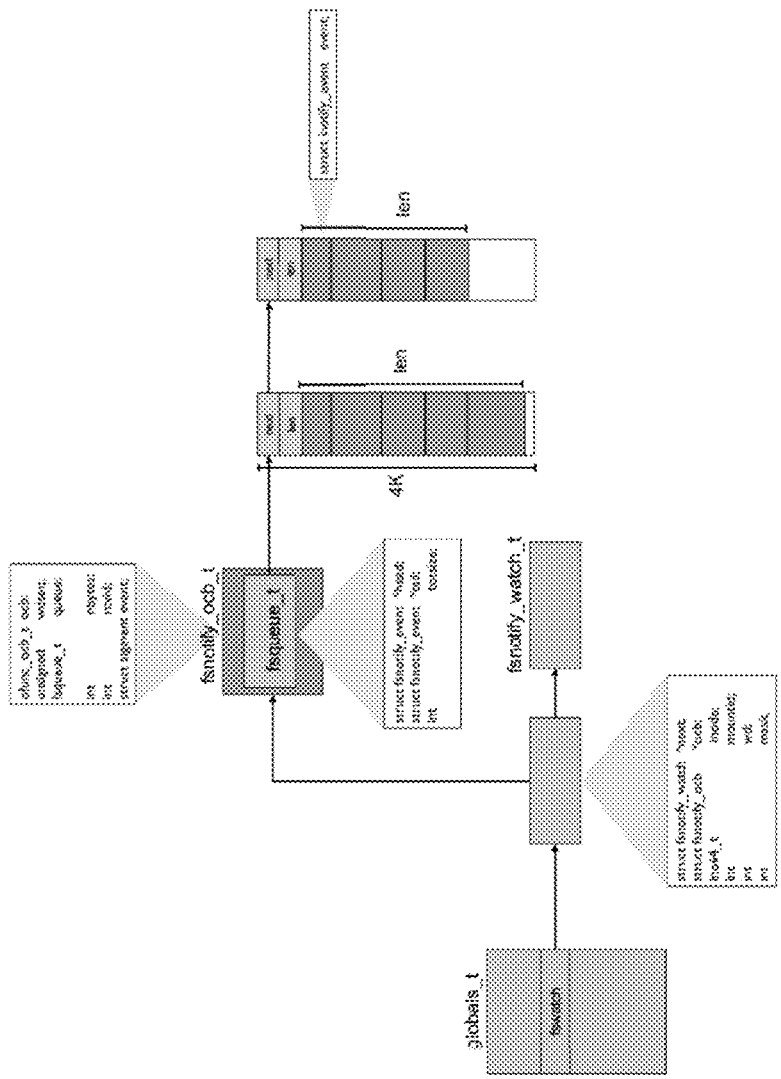
FIG. 25 illustrates an inotify mechanism.

FIG. 25 illustrates an inotify mechanism. The inotify API provides a mechanism for monitoring file system events. Inotify may monitor individual files, or monitor directories. When a directory is monitored, inotify will return events for the directory itself, and for files inside the directory. In FIG. 25, an fswatch function occurs from a request from an application. It establishes what the entities are interested in. Each time a watch is placed, an fsnotify_watch_t is generated. The system tracks which file is being watched and what specific operations are being monitored on that file. The fsnotify_ocb_t establishes what it is watching and what the requesters are interested in. The fsqueue_t stores the events that the reports are based off. The struct sigevent event are the actual notify events that need to be told. They are sent off to entities. The inotify_event describes the range of data within the file that was modified. It may say it was written from offset range such as 4 k to an offset 1 M, for example. The notify_add( ) as a function call scans the watch list, if it finds a match, it creates an fsnotify_event_t, and it adds it to the queue.

Figure 26:
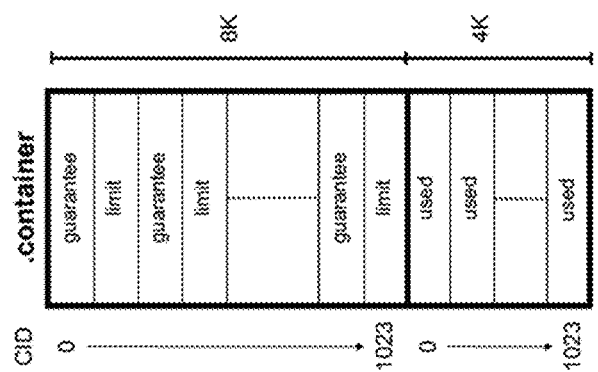
FIG. 26 represents a container.

FIG. 26 represents a container. The .container files size (attr.nbytes) is a fixed size, such as 12K, for example, and is RW (readable and writeable) by root. The file cannot be grown, moved or unlinked. In FIG. 26, there are over a thousand container ids and over a thousand designations of used that correspond to them. The file system Core updates the used reference on each transaction. A container may lock down three cache pages to keep the container in memory. The lock down of three cache pages ensure that write functions update the in memory reference and the onmedia copy.

Figure 27:
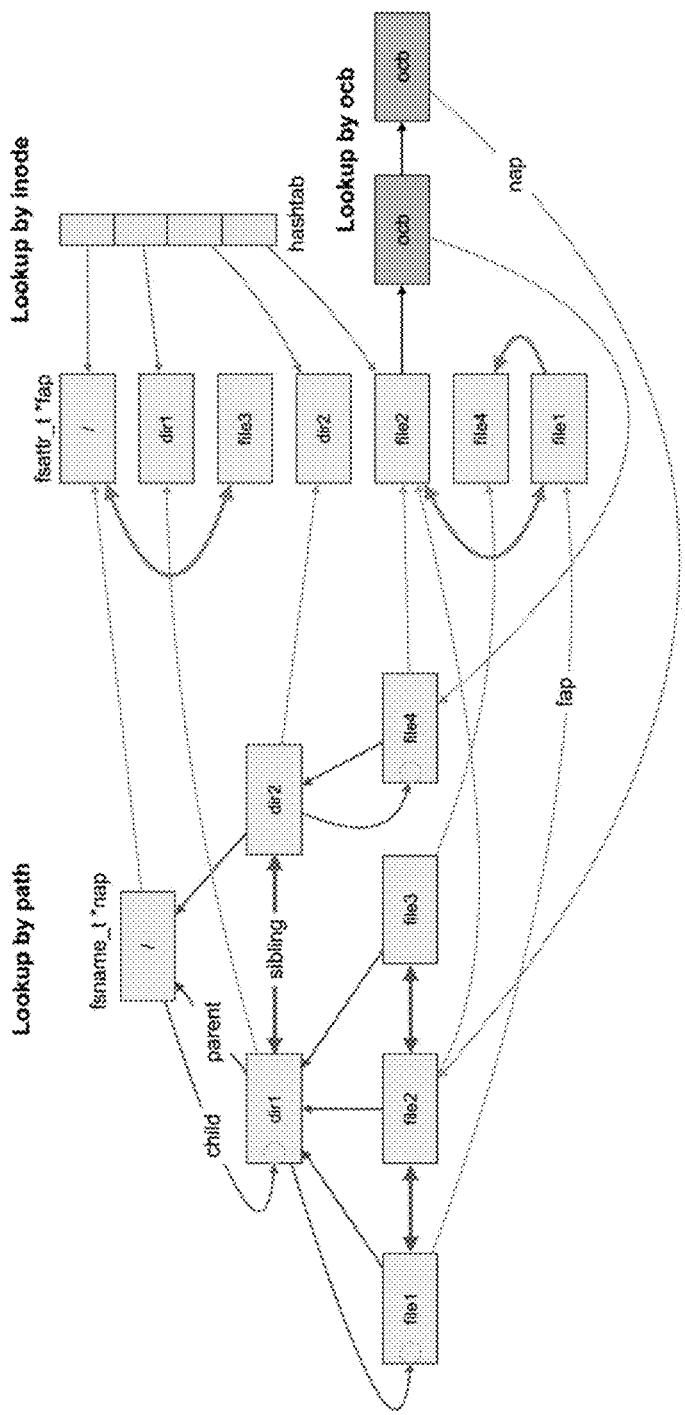
FIG. 27 shows a tracking of names and attributes.

FIG. 27 shows a tracking of names and attributes. When a file is opened, a File Attribute Pointer (FAP) is generated, but the file may not know its own name. To track its own name, a variable that contains the memory location (address) in a cache or Name Attribute Pointer (NAP) points to its name in cache. However, when a hard link is used, the connection is severed because a hard link could point to two maps. FIG. 27 shows the files in the tree know the directory they belong to and the files track their names via paths and the NAP. Lookup may also occur more directly via the inode because each inode has a serial number that is also associated with a file. In some use cases, when a file is accessed by its serial number, access to the file reveals its name via the associated NAP. In this use case, the inode reconstructs the file name. Thus, in FIG. 27, names are identified by paths and by an inode.

Figure 28:
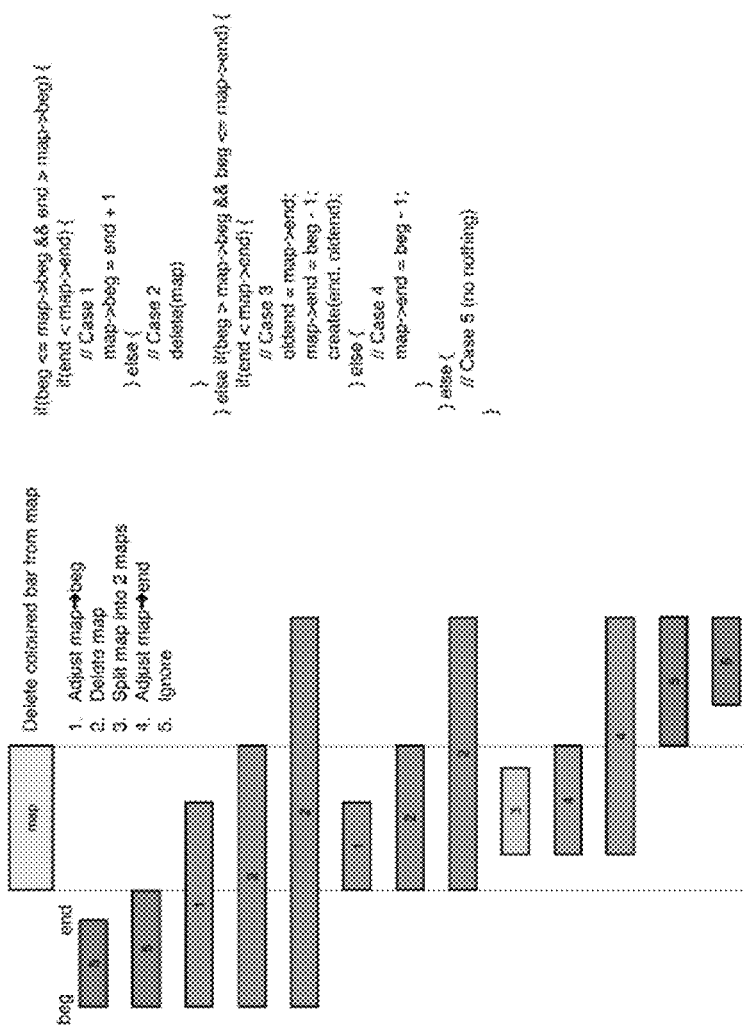
FIG. 28 illustrates a trimming and mapping mechanism.

FIG. 28 illustrates a trimming and mapping mechanism. On magnetic drives, deleted files are not completely removed from the disk at the time of deletion. This is why deleted files can be recovered. However, with flash memory, new data can only be written on completely new or erased cells of the drive. Because the space must be cleared before a write event, if enough free space is not already available in flash at the time a file is being written, it must be erased first. This affects performance. Thus, by not trying to erase unused space just before writing, file system performance improves. In FIG. 28, a trim command removes data from cells that are not completely new or erased. In operation, a continuous or discontinuous map is overlaid over the cells of data that are not in use and wiped internally. As shown, the map may be adjusted to overlap the beginning, end, or split into multiple maps to overlap the cells not in use, and thereafter discarded.

Figure 29:
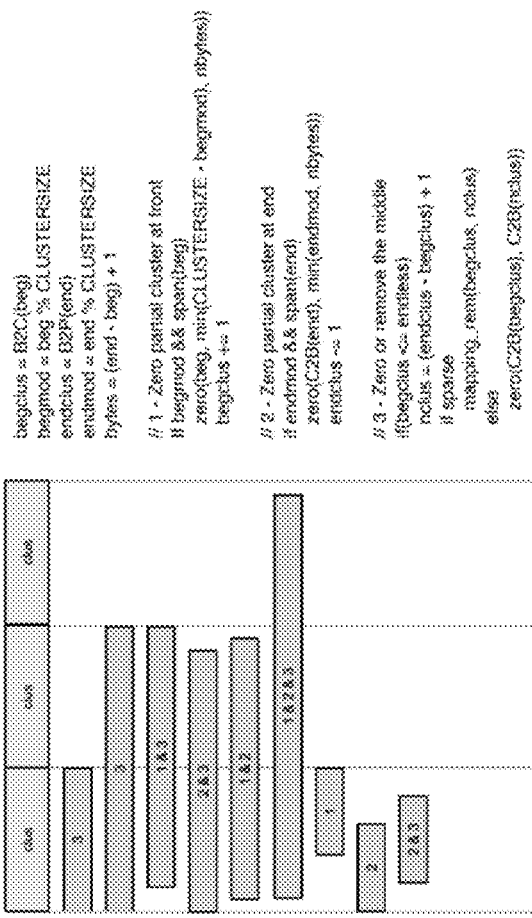
FIG. 29 shows an io_space trim command and conditional rules.

FIG. 29 shows an io_space trim command and conditional rules. The io_space trim is a command that allocates storage space or deallocates storage space from a resource. It may modify the clusters of a file to make it something less in size or grow the file making it something more in size. Like the trimming and mapping mechanism, it may discard clusters near the front of the cluster, end of the cluster, or remove clusters from the middle.

Figure 30:
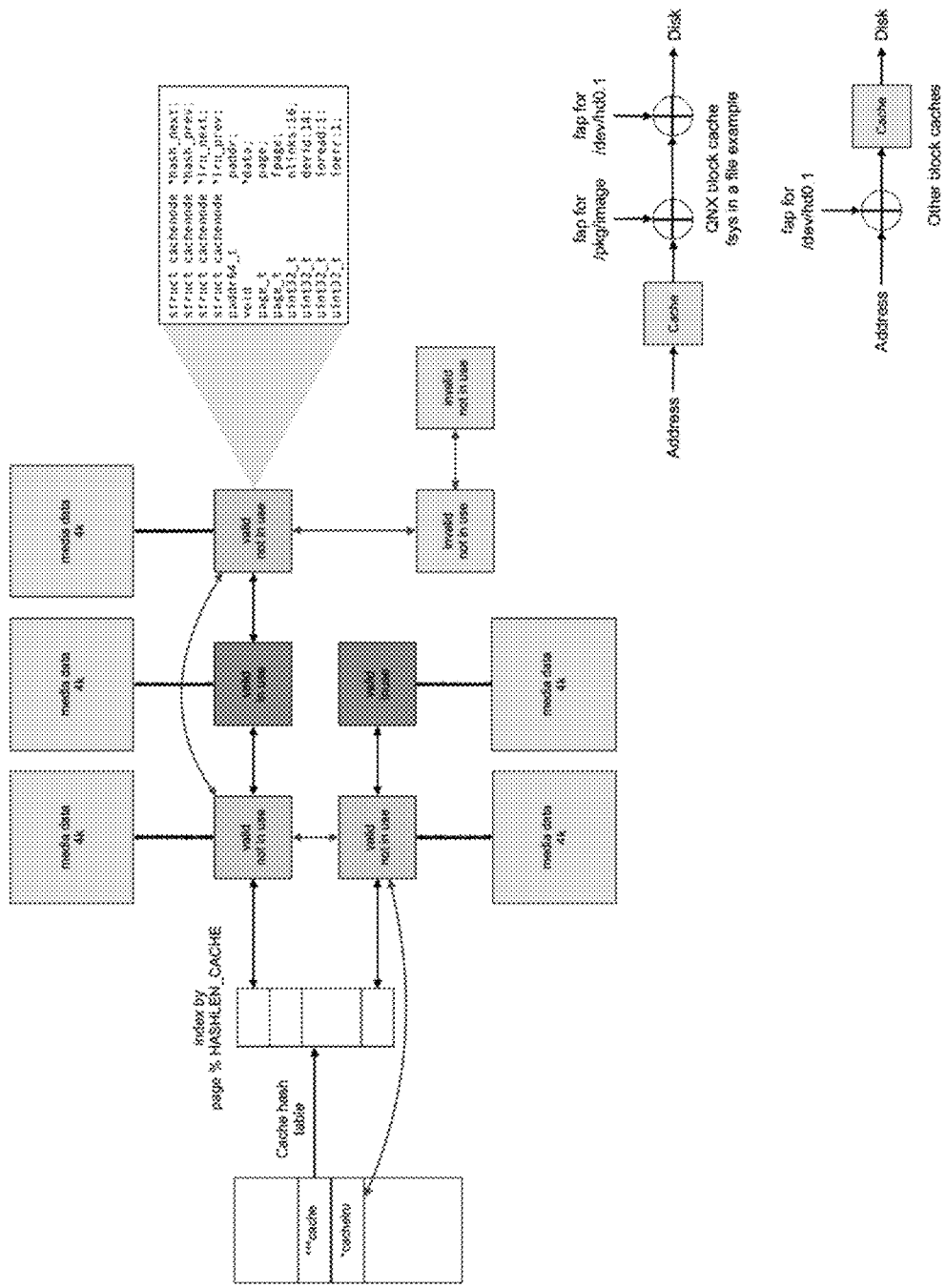
FIG. 30 illustrates block cache.

FIG. 30 illustrates block cache. A block cache is memory that holds content that matches the content on the hard drive, pending either to be written to the hard drive or read from the hard drive. When a program wants to read a file it cannot go straight from the hard drive to the program's buffer. The driver must first copy the file into Random Access Memory (RAM) and second execute a memory copy that copies the file into the location buffer. Cache is used as an intermediate or surrogate. When writing for performance, the system may store it in cache and later in a more optimal way push it down to the hard drive. A block cache is the intermediate.

In FIG. 30, shows the cache_get( ) routine. This routine searches the cache for a desired cluster. The routine looks for the desired cluster, hashes the address of the data desired and part of the file system it resides on the hard drive, and if it is found and valid, it is either loaded or tracked. When a standard hash table and the length of the cache is used, the file system block cache identifies three states: valid in use, valid not in use, and invalid not in use. Valid in use means the system made changes to the content when compared to what is stored in the hard drive and it is waiting to be written out. Valid not in use means the content in the cache and the hard drive are the same. Invalid not in use means the content is invalid and not in use.

If the cache_get( ) routine searches the cache for a the desired cluster and if it does not receive it, the routine issues a physical IO command down to the hard drive, requests the desired page when it is not in use, and issues a second physical IO command to stuff the data into the specified page. The routine then returns confirmation of its retrieval to the requestor like a virtually indexed cache. Known systems use a physically indexed cache. In these systems, after finding the physical sector on the hard drive that stored the desired data, the physical cache will retrieve it. In cases where the data is stored in nested files known systems traverse through the nesting at the direction of the user; while the cache_get( ) routine resolves the nesting automatically with no limit on the number of nesting allowed.

The cache_get( ) routines also take a page offset which is based off the device it is mounted on. This allows file systems to be mounted on any FAP including files in an existing file system. This also differs from many other file system block caches, which take absolute block numbers based on the underlying media.

Alternatively, as shown in FIG. 30, an address may be used to access the cache. If the address does not find it, the output is translated with the FAP of the package image and hard drive and accessed from the physical sector of the hard drive. The second alternate translates the address with the FAP of the hard drive before it searches the cache. If it does not find it, it searches the hard drive.

Figure 31:
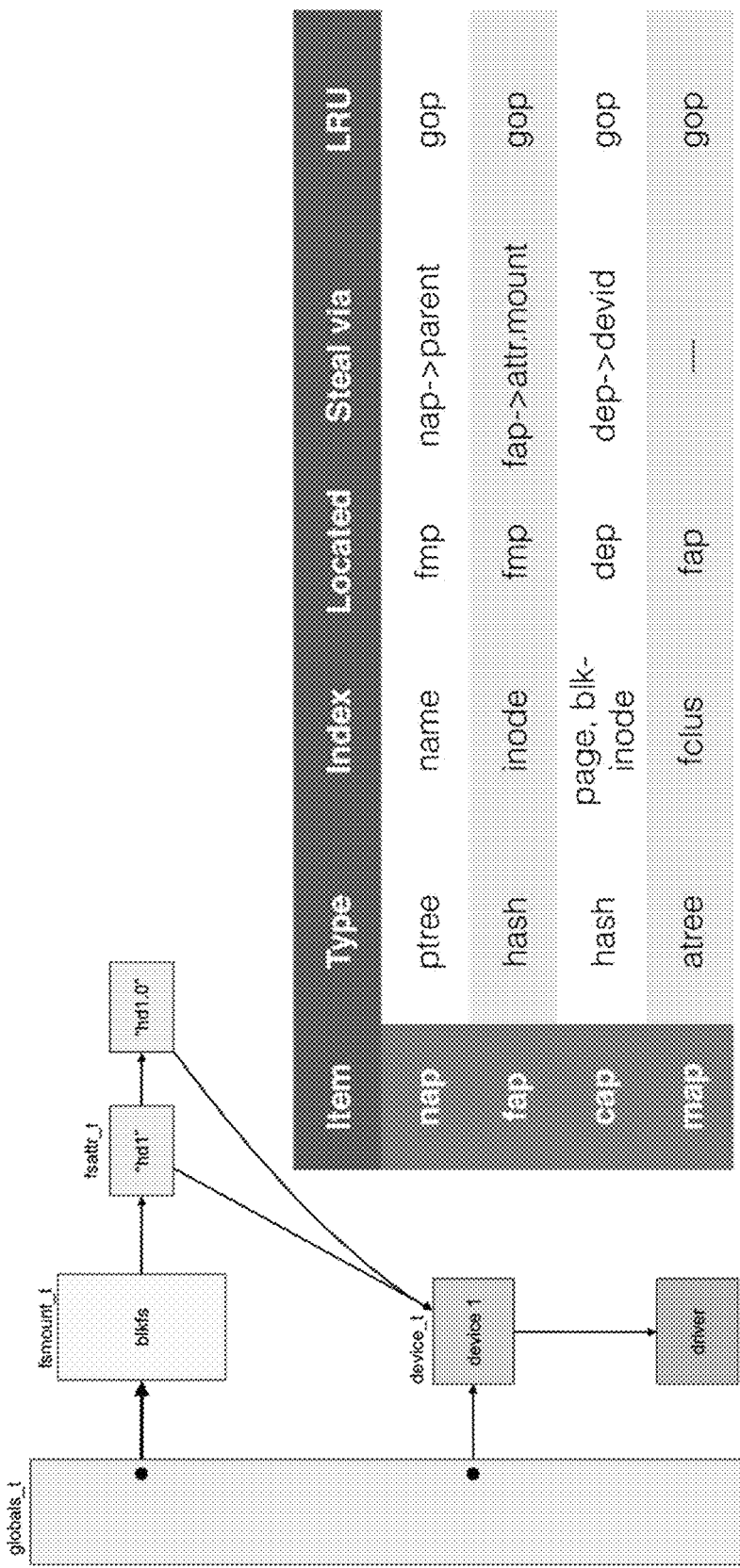
FIG. 31 shows the major data structures.

FIG. 31 shows a table of the major data structures associated with the file system framework shown in FIG. 23. Specifically, it itemizes the Name Attribute Pointer (NAP), File Attribute Pointer (FAP), Cache Attribute Pointer (CAP), and a MAP (the modified Anderson tree). Here, NAP has a ptree data type, indexed on name information, located in the fmp profile (e.g., in the blkfs), it is hooked off the mount structure (not shown) and it is stolen via the parent. FAP is stored as a hash list, indexed in the inode, held on the global mount structure, stolen via the attribute mount. CAP is stored as a hash tree, stored in the page and blocks of the inode, stored in the device pointer (e.g., in device 1), and stolen by the device id. MAP is a modified Anderson tree, stores the free clusters (e.g., clusters are the smallest units to be allocated).

Figure 32:
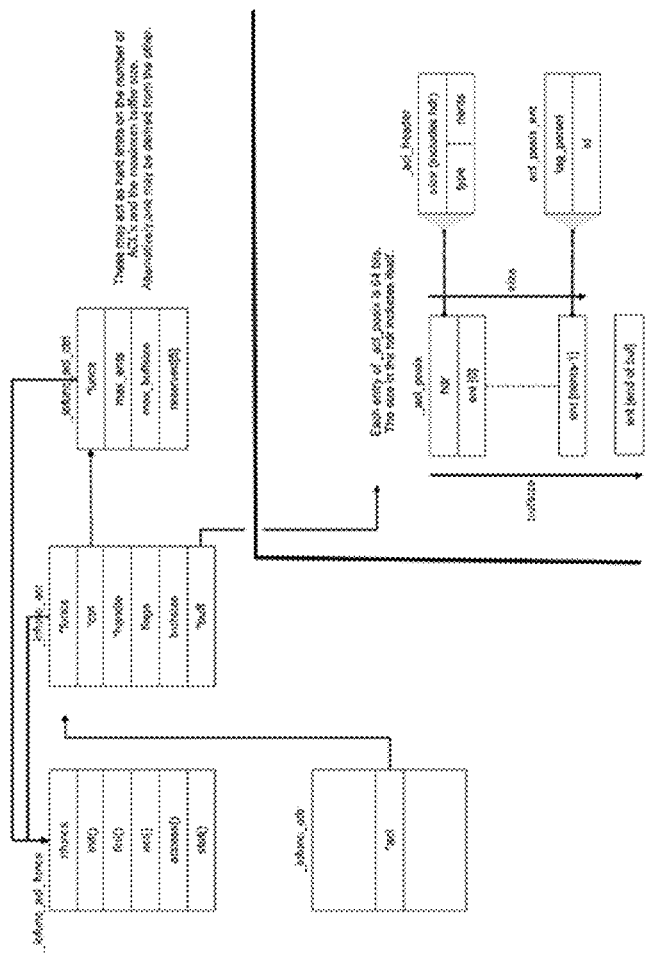
FIG. 32 shows FTFS Access Control List (ACL).

FIG. 32 shows FTFS ACL (access control list). In some file permissions, the file knows the user and group that owns the file, if the user is allowed to read, write, or execute the file, if a member of the group can read or execute the file, if not a member of the group can another read, write or execute the file. The solution establishes three things that may be done based on the owner, same group as the owner, or another. The FTFS ACL allows a finer grain control. The ACL may identify the owner or group member by name when granting permissions. In some systems, the ACL permissions are not persistent.

Figure 33:
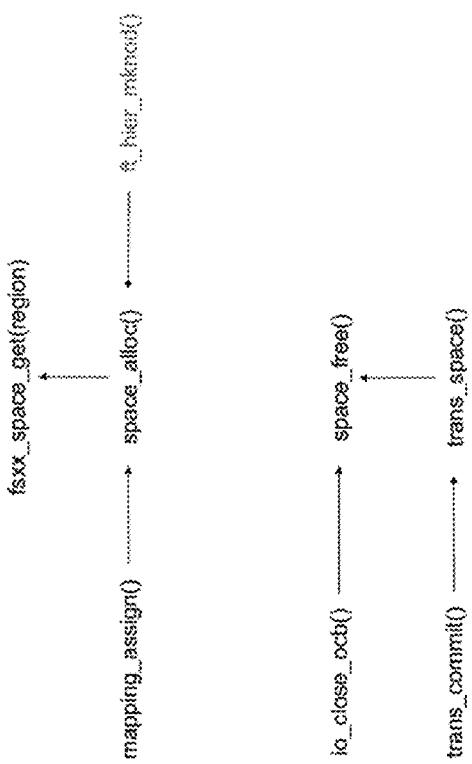
FIG. 33 shows example functions.

FIG. 33 shows global free space. The space_alloc( ) and space_free( ) commands only deal with the internal freespace_t data structures. The space_alloc( ) command does make callouts to fill this space as needed. Neither function makes changes to the disk. Once storage is allocated, it cannot be freed except when a transaction is called. If it is freed too early before a transaction, the space could end up being over-written by other data before the transaction happens. The system allocates the space first and it never gets released until the transaction is completed. If the system allocates space first but never commits it via transaction, then it may return it via a simple space_free( ) command. The mapping_assign( ) function overallocates space so that on close we can trim it back and get back the extra space. In the end, it will appear as if an over-allocation was never part of the transaction.

FIG. 33 provides some example functions. The mapping_assign( ) calls the space_alloc( ), which calls fsxx_space_get(region) or the specific file system space get. Therefore, there is a call out to say for this specific file system how do I get what space is available. So, when you close the file (via iofunc_close_ocb( )) that will invoke a space_free( ) which will give back the space or if you commit your transaction that invokes a trans_space( ) that will invoke a space_free( ) which will give back the space.

Figure 34:
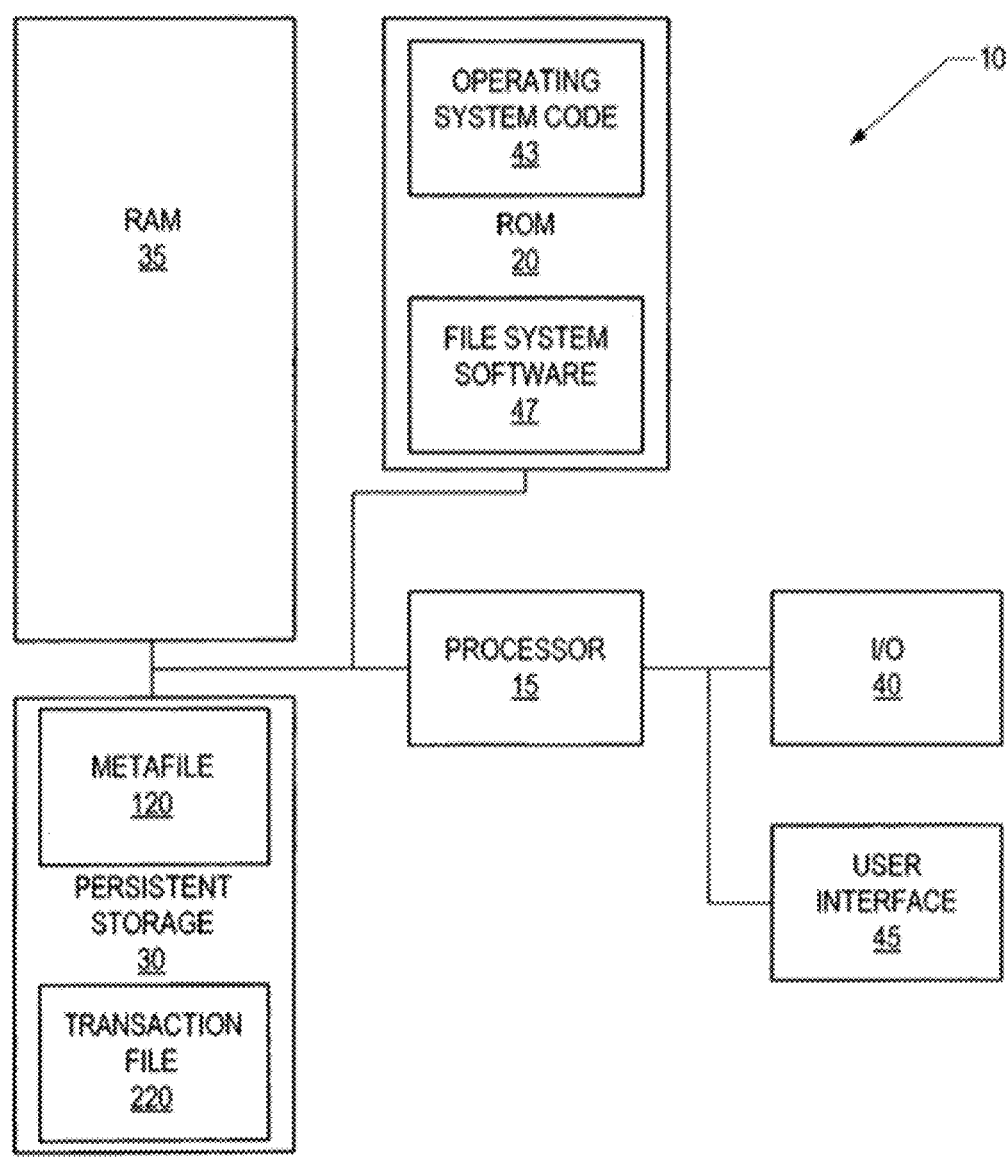
FIG. 34 shows a computer system that implements the file system framework.

FIG. 34 illustrates the components that may be employed in the file system framework running on a computer system 10. Examples of computer system 10 include with limitation, computers, servers, peripherals, personal computers, laptops, tablet computers, e-readers, mobile devices, smartphones, mobile phones, wearable computers including smartwatches, gaming devices, video game consoles, navigation devices, cameras, IoT (Internet of Things) devices, EoT (Enterprise of Things) devices, endpoints, communication nodes, buildings including homes, set-top boxes, digital media players, appliances, home automation devices, smart speakers, personal assistants, robots, smart devices, vehicles, traffic systems, embedded systems, etc. As shown, the system 10 includes a processor 15, read only memory 20, and a persistent storage unit 30 storing a metafile 120 and a transaction file 220. The computer system 10 also may include an optional random access memory 35, an optional IO interface 40, and an optional user interface 45. The specific components that comprise the computer system 10 may be tailored to the particular function(s) that are to be executed by the computer system 10. Accordingly, the presence or absence of a component, other than processor 15, may be specific to the design criterion imposed on the computer system 10. For example, user interface 45 may be omitted when the computer system 10 takes the form of an embedded controller or the like.

Read only memory 20 may include operating system code 43 that controls the interaction between high-level application programs executed by the processor 15 and the various hardware components, including memory devices 20 and 35, the persistent storage unit 30, and the interface devices 40 and 45. The operating system code 43 may include one or many file systems for organizing files stored on the persistent storage unit 30. Alternatively, the file system software may be provided as a separate software component that merely interacts with the operating system code 43. In the latter case, the code corresponding to the file system software may be stored in read only memory 20, persistent storage unit 30 or the like. When computer system 10 is networked with other computers and/or storage devices through IO interface 40, the file system software may be stored remotely and downloaded to computer system 10 as needed. FIG. 34, however, illustrates storage of the file system software 47 in read only memory 20 as just one system. Alternate systems may store the file system software in a transient medium.

The persistent storage unit 30 may take on any number of different forms. For example, the persistent storage unit 30 may take the form of a hard disk drive and the like. It also may be in the form of a non-rotating media device, such as non-volatile memory implemented in an integrated circuit format (e.g., flash memory, and the like.). Still further, persistent storage unit 30 need not be limited to a single memory structure. Rather, the persistent storage unit 30 may include a number of separate storage devices of the same type (e.g., all flash memory) and/or separate storage devices of different types (e.g., one or more flash memory units and one or more hard disk drives).

The files stored in the persistent storage unit 30 include data that is interpreted in accordance with a predetermined format used by an application program or by the operating system code 43. For example, the data stored within a file may constitute the software code of an executable program, the ASCII text of a database record, data corresponding to transactions executed (or not executed) by computer system 10, and the like.

Figure 35:
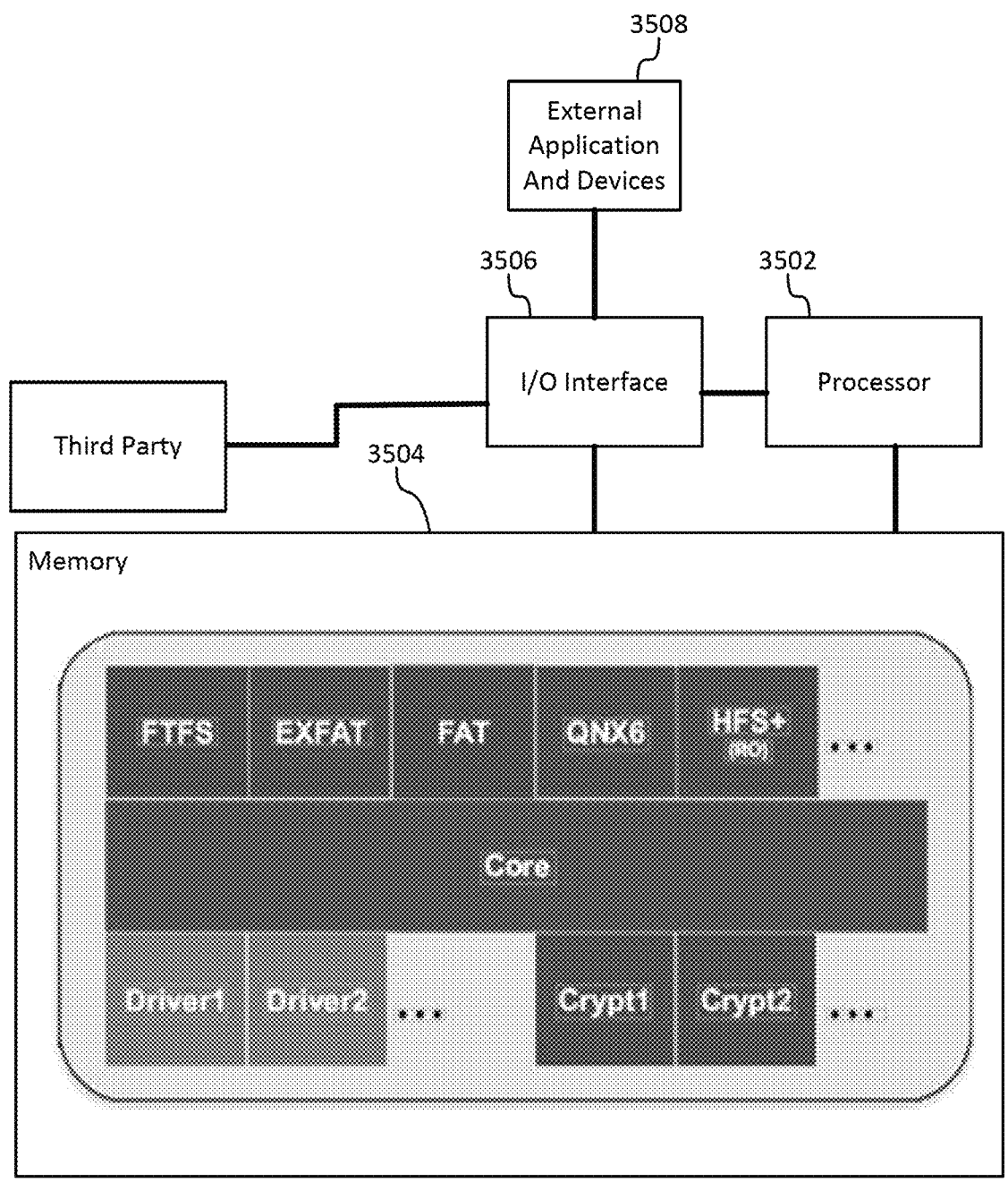
FIG. 35 shows a system that implements the file system framework.

FIG. 35 is a block diagram of a system that implements the file system framework. The system may comprise a vehicle, a mobile device such as a smartphone, or other computer system that implements the file system framework. The system comprises a processor 3502, a non-transitory media such as a memory 3504 (the contents of which are accessible by the processor 3502) and an IO interface 3506. The IO interface 3506 connects devices and local and/or remote applications such as, for example, modified or additional local and/or remote devices. The memory 504 may store instructions which when executed by the processor 502 causes the system to render some or all of the functionality associated with the file system framework.

The processors 3502 may comprise a single processor or multiple processors that may be disposed on a single chip, on multiple devices, or distributed over more than one system. The processors 3502 may be hardware that executes computer executable instructions or computer code embodied in the memory 3504 or in other memory to perform one or more features of the systems described herein. The processor 3502 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 3504 and/or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 3504 may comprise a single device or multiple devices that may be disposed on one or more dedicated memory devices or disposed on a processor or other similar device. When functions or steps are said to be "responsive to" or occur "in response to" a function or a process, the device functions or steps necessarily occur as a result of the function or message. It is not sufficient that a function or act merely follow or occur subsequent to another.

The memory 3504 may also store a non-transitory and transitory computer code, executable by processor 3502. The computer code may be written in any computer language, such as C, C++, assembly language, channel program code, and/or any combination of computer languages. The memory 3504 may store information in data structures.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The subject-matter of the disclosure may also relate, among others, to the following aspects:

1. A computer system comprising:
   a processor;
   a persistent data storage device accessible by the processor, the persistent data storage device comprising flash-like storage media, wherein the flash-like storage media includes a plurality of contiguous memory blocks, and each of the plurality of contiguous memory blocks includes a plurality of contiguous memory pages;
   a plurality of separate file systems executable by the processor for managing file data and file system structure of files stored in the persistent data storage device; and
   a core executable by the processor that provides a common internal model and routines that provide common functionality utilized by each of the plurality of separate file systems.

2. The computer system of claim 1 wherein each of the plurality of separate file systems utilizes no more than eight time lines of code than the core.

3. The computer system of any of claims 1 to 2 wherein the core interfaces each of the separate file systems to one or more device drivers.

4. The computer system of any of claims 1 to 3 wherein the core interfaces each of the separate file systems to one or more cryptographic modules.

5. The computer system of any of claims 1 to 4 wherein the core provides the plurality of separate file systems with common source files.

6. The computer system of any of claims 1 to 5 wherein the routines are executed at the time they are needed through a library.

7. The computer system of any of claims 1 to 6 wherein one of the plurality of separate file systems comprises a Hierarchical File System Plus.

8. The computer system of any of claims 1 to 7 wherein the computer system comprises a vehicle.

9. The computer system of any of claims 1 to 8 wherein the computer system comprises a mobile device.

10. The computer system of any of claims 1 to 9 wherein one or more the separate file systems is executable to reconstruct the one or more file systems using a plurality of transaction records that may be executed a plurality of times and render the same effect.

11. The computer system of claim 10 wherein each of the plurality of separate file system comprise a Read/Write File System.

12. The computer system of any of claims 10 to 11 wherein a crash loop has no effect on the reconstruction of the one or more file systems.

13. The computer system of any of claims 10 to 12 wherein the reconstruction of the one or more file systems occurs on a file-by-file basis.

14. The computer system of any of claims 10 to 13 wherein the reconstruction of each of the plurality of separate file systems occurs independent of each of the plurality of separate file systems having such capability in the plurality of separate file system's on-media specification.

15. A machine readable medium encoded with machine-executable instructions, wherein execution of the machine-executable instructions is for:
    accessing a persistent data storage comprising flash-like storage media, wherein the flash-like storage media includes a plurality of contiguous memory blocks, and each of the plurality of contiguous memory blocks includes a plurality of contiguous memory pages;
    managing file data and file system structure of files stored in the persistent data storage device through a plurality of separate file systems; and
    providing a common internal model and routines that provide common functionality utilized by each of the plurality of separate file systems through a core.

16. The machine readable medium of claim 15 wherein each of the plurality of separate file systems utilizes less than at least eight time lines of code than the core.

17. The machine readable medium of any of claims 15 to 16 wherein the core interfaces each of the separate file systems to one or more device drivers.

18. The machine readable medium of any of claims 15 to 17 wherein the core interfaces each of the separate file systems to one or more cryptographic modules.

19. The machine readable medium of any of claims 15 to 18 wherein the core provides the plurality of separate file systems with common source files.

20. The machine readable medium of any of claims 15 to 19 wherein the routines are executed at the time they are needed through a library.

21. The machine readable medium of any of claims 15 to 20 wherein one of the plurality of separate file systems comprises a Hierarchical File System Plus.

22. The machine readable medium of any of claims 15 to 21 wherein one or more of the plurality of separate file systems is executable to reconstruct the one or more file systems using a plurality of transaction records that may be executed a plurality of times and render the same effect.

23. The machine readable medium of claim 22 wherein each of the plurality of separate file systems comprise a Read/Write File System.

24. The machine readable medium of any of claims 22 to 23 wherein a crash loop has no effect on the reconstruction of the one or more file systems.

25. The machine readable medium of any of claims 22 to 24 wherein the reconstruction of each of the plurality of separate file systems occurs on a file-by-file basis.

26. The machine readable medium of any of claims 22 to 25 wherein the reconstruction of each of the plurality of separate file systems occurs independent of each of the plurality of separate file systems having such capability in the plurality of separate file system's on-media specification.

27. A method of providing a file system framework, the method comprising:
    accessing a persistent data storage comprising flash-like storage media, wherein the flash-like storage media includes a plurality of contiguous memory blocks, and each of the plurality of contiguous memory blocks includes a plurality of contiguous memory pages;
    managing file data and file system structure of files stored in the persistent data storage device through a plurality of separate file systems; and
    providing a common internal model and routines that provide common functionality utilized by each of the plurality of separate file systems through a core.

28. The method of claim 27 wherein each of the plurality of separate file systems utilizes less than at least eight time lines of code than the core.

29. The method of any of claims 27 to 28 wherein the core interfaces each of the separate file systems to one or more device drivers.

30. The method of any of claims 27 to 29 wherein the core interfaces each of the separate file systems to one or more cryptographic modules.

31. The method of any of claims 27 to 30 wherein the core provides the plurality of separate file systems with common source files.

32. The method of any of claims 27 to 31 wherein the routines are executed at the time they are needed through a library.

33. The method of any of claims 27 to 32 wherein one of the plurality of separate file systems comprises a Hierarchical File System Plus.

The file system framework (or architecture) allows users to write file systems with ease. Based on the use of shared objects, the framework supports mountable entities including virtual file systems. The framework supports a new FTFS designed for flash media that supports transactions, space accounting, encryption, extended mappings in the inode, inode updates with a single input and output, hard and soft links, access control lists, and sparse file support. The framework also supports other file systems including File Allocation Tables (FAT), Extended File Allocation Tables (EXFAT), Unix-like file systems like QNX6 file systems, and file systems developed by Apple Inc., such as HFS Plus or HFS+, and others. The system allows functionality to be added or removed through modules. The modules may be used within computer systems, telephone systems, and vehicles and may interface an infotainment processor and digital signal processors or DSPs and co-exist and communicate with other embedded system software. A vehicle may include an automatically or manual device or structure including without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things. The system is easy and quickly adapted to different processors and memory configurations.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A computer system comprising:
a processor; and
memory coupled to the processor and storing instructions that, when executed, cause the processor to:
interface a core to a plurality of file system modules, the core providing common functionality utilized by each particular file system module of the plurality of file system modules and each particular file system module of the plurality of file system modules configured to manage a respective and distinct type of file system;
track deltas by the core and on a file-by-file basis, the deltas holding changes for respective files stored in a file system in persistent data storage including a flash-like storage media, wherein the flash-like storage media includes a plurality of contiguous memory blocks, and managed using a particular file system module of the plurality of file system modules;
execute a file synchronization function, through the core and on a file-by-file basis, in relation to the respective files stored in the file system in persistent data storage to push changes to the respective files to the persistent data storage; and
reconstruct the file system, by the core using the deltas and an idempotent transaction record, independently of the on-media specification of the particular file system module supporting such reconstruction.

2. The computer system of claim 1 wherein each of the plurality of separate file system modules utilizes no more than eight time lines of code than the core.

3. The computer system of claim 1 wherein the core interfaces each of the plurality of file system modules to one or more device drivers.

4. The computer system of claim 1 wherein the core interfaces each of the plurality of file system modules to one or more cryptographic modules.

5. The computer system of claim 1 wherein the particular file system module is configured to manage a Hierarchical File System Plus file system.

6. The computer system of claim 1 wherein each of the plurality of file system modules manage a Read/Write File System.

7. The computer system of claim 1 wherein the instructions, when executed by the processor, further cause the computer system to:
identify, using a file handle of a file, a rule for allocating storage space within the flash-like storage media for the file used to identify the rule, the rule for allocating storage space within the flash-like storage media for the file used to identify the rule indicating a type of storage within the flash-like storage media that is expected to be consumed by the file when stored in the flash-like storage media, a grow value for establishing an expected grow size of the file relative to the current size of the file, and a separate boundary value for enforcing a boundary on the expected grow size; and
allocate storage space within the flash-like storage media for the file based on the rule.

8. The computer system of claim 7 wherein the rule comprises at least one of an audio rule, a video rule, a database rule, or an executable rule.

9. The computer system of claim 7 wherein the file handle comprises at least one of an mp3 file handle, an acc file handle, an mp4 file handle, or an sql file handle.

10. The computer system of claim 7 wherein the instructions that cause the processor to the allocate storage space based on the rule further include instructions that cause the processor to group similar sized requests for storage space in a same region of the persistent data storage device based on the rule.

11. The computer system of claim 7 wherein the boundary value enforces a lower boundary on the expected grow size.

12. A non-transitory machine readable medium encoded with machine-executable instructions, wherein execution of the machine-executable instructions is for:
interfacing a core to a plurality of file system modules, the core providing common functionality utilized by each particular file system module of the plurality of file system modules and each particular file system module of the plurality of file system modules configured to manage a respective and distinct type of file system;
tracking deltas by the core and on a file-by-file basis, the deltas holding changes for respective files stored in a file system in persistent data storage including a flash-like storage media, wherein the flash-like storage media includes a plurality of contiguous memory blocks, and managed using a particular file system module of the plurality of file system modules;
executing a file synchronization function, through the core and on a file-by-file basis, in relation to the respective files stored in the file system in persistent data storage to push changes to the respective files to the persistent data storage; and
reconstructing the file system, by the core using the deltas and an idempotent transaction record, independently of the on-media specification of the particular file system module supporting such reconstruction.

13. The non-transitory machine readable medium of claim 12 wherein each of the plurality of separate file system modules utilizes less than at least eight time lines of code than the core.

14. The non-transitory machine readable medium of claim 12 wherein the core interfaces each of the plurality of file system modules to one or more device drivers.

15. The non-transitory machine readable medium of claim 12 wherein the core interfaces each of the plurality of file system modules to one or more cryptographic modules.

16. The non-transitory machine readable medium of claim 12 wherein the particular file system module is configured to manage a Hierarchical File System Plus file system.

17. The non-transitory machine readable medium of claim 12 wherein each of the plurality of file system modules manage a Read/Write File System.

18. A method of providing a file system framework, the method comprising:

interfacing a core to a plurality of file system modules, the core providing common functionality utilized by each particular file system module of the plurality of file system modules and each particular file system module of the plurality of file system modules configured to manage a respective and distinct type of file system;

tracking deltas by the core and on a file-by-file basis, the deltas holding changes for respective files stored in a file system in persistent data storage including a flash-like storage media, wherein the flash-like storage media includes a plurality of contiguous memory blocks, and managed using a particular file system module of the plurality of file system modules;

executing a file synchronization function, through the core and on a file-by-file basis, in relation to the respective files stored in the file system in persistent data storage to push changes to the respective files to the persistent data storage; and reconstructing the file system, by the core using the deltas and an idempotent transaction record, independently of the on-media specification of the particular file system module supporting such reconstruction.

19. The method of claim 18 wherein each of the plurality of separate file system modules utilizes less than at least eight time lines of code than the core.

20. The method of claim 18 wherein the core interfaces each of the plurality of file system modules to one or more device drivers.

21. The method of claim 18 wherein the core interfaces each of the plurality of file system modules to one or more cryptographic modules.

22. The method of claim 18 wherein the particular file system module is configured to manage a Hierarchical File System Plus file system.

23. The method of claim 18 further comprising:

identifying, using a file handle of a file, a rule for allocating storage space within the flash-like storage media for the file used to identify the rule, the rule for allocating storage space within the flash-like storage media for the file used to identify the rule indicating a type of storage within the flash-like storage media that is expected to be consumed by the file when stored in the flash-like storage media, a grow value for establishing an expected grow size of the file relative to the current size of the file, and a separate boundary value for enforcing a boundary on the expected grow size; and allocating storage space within the flash-like storage media for the file based on the rule.

24. The method of claim 23 wherein the rule comprises at least one of an audio rule, a video rule, a database rule, or an executable rule.

25. The method of claim 23 wherein the file handle comprises at least one of an mp3 file handle, an acc file handle, an mp4 file handle, or an sql file handle.

\* \* \* \* \*